United States Patent
Ichikawa et al.

(10) Patent No.: US 9,786,931 B2
(45) Date of Patent: Oct. 10, 2017

(54) FUEL CELL SYSTEM AND METHOD FOR CONTROLLING SAME

(75) Inventors: Yasushi Ichikawa, Kanagawa-ken (JP); Keigo Ikezoe, Ayase (JP); Kenichi Goto, Ayase (JP); Ken Nakayama, Yokohama (JP); Mitsunori Kumada, Yokosuka (JP); Yousuke Tomita, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1069 days.

(21) Appl. No.: 13/129,986

(22) PCT Filed: Nov. 16, 2009

(86) PCT No.: PCT/JP2009/069425
§ 371 (c)(1),
(2), (4) Date: Aug. 2, 2011

(87) PCT Pub. No.: WO2010/058747
PCT Pub. Date: May 27, 2010

(65) Prior Publication Data
US 2011/0274998 A1    Nov. 10, 2011

(30) Foreign Application Priority Data

Nov. 21, 2008 (JP) .................. 2008-298191
Nov. 27, 2008 (JP) .................. 2008-302465

(51) Int. Cl.
*H01M 8/04* (2016.01)
*H01M 8/04089* (2016.01)
(Continued)

(52) U.S. Cl.
CPC ... *H01M 8/04104* (2013.01); *H01M 8/04388* (2013.01); *H01M 8/04753* (2013.01);
(Continued)

(58) Field of Classification Search
CPC ......... H01M 8/04231; H01M 8/04388; H01M 8/04395
(Continued)

(56) References Cited

U.S. PATENT DOCUMENTS

| 4,869,283 A | 9/1989 | Oeffling et al. |
| 5,191,867 A | 3/1993 | Glassey |

(Continued)

FOREIGN PATENT DOCUMENTS

| CA | 2 634 927 A1 | 10/2007 |
| EP | 0 320 645 A2 | 6/1989 |

(Continued)

OTHER PUBLICATIONS

Machine translation of JP 2003173807 A, Arai et al., Japan, 2003.*

(Continued)

*Primary Examiner* — Emily Le
*Assistant Examiner* — Brent Thomas
(74) *Attorney, Agent, or Firm* — Foley & Lardner LLP

(57) ABSTRACT

A fuel cell system 100 includes: a fuel cell 1 for generating a power by causing an electrochemical reaction between an oxidant gas supplied to an oxidant electrode 34 and a fuel gas supplied to a fuel electrode 67; a fuel gas supplier HS for supplying the fuel gas to the fuel electrode 67; and a controller 40 for controlling the fuel gas supplier HS to thereby supply the fuel gas to the fuel electrode 67, the controller 40 being configured to implement a pressure change when an outlet of the fuel electrode 67 side is closed, wherein based on a first pressure change pattern for implementing the pressure change at a first pressure width $\Delta P1$, the controller 40 periodically changes a pressure of the fuel gas at the fuel electrode 67.

26 Claims, 15 Drawing Sheets

(51) Int. Cl.
*H01M 8/0438* (2016.01)
*H01M 8/04746* (2016.01)
*H01M 8/04119* (2016.01)
*H01M 8/0432* (2016.01)
*H01M 8/1018* (2016.01)

(52) U.S. Cl.
CPC .... *H01M 8/04179* (2013.01); *H01M 8/04365* (2013.01); *H01M 8/04395* (2013.01); *H01M 2008/1095* (2013.01)

(58) Field of Classification Search
USPC ........................................................ 429/446
See application file for complete search history.

(56) References Cited

U.S. PATENT DOCUMENTS

| | | | |
|---|---|---|---|
| 5,629,104 | A | 5/1997 | Crawford, Sr. et al. |
| 6,777,118 | B2 | 8/2004 | Shioya |
| 6,964,821 | B2 | 11/2005 | Hirakata |
| 2001/0018142 | A1 | 8/2001 | Kato et al. |
| 2002/0072834 | A1 | 6/2002 | Scheffler et al. |
| 2003/0157383 | A1* | 8/2003 | Takahashi ........................ 429/22 |
| 2004/0241504 | A1 | 12/2004 | Summers et al. |
| 2005/0123811 | A1* | 6/2005 | Gottwick ............ H01M 8/04089 429/430 |
| 2005/0142400 | A1* | 6/2005 | Turco et al. .................... 429/13 |
| 2005/0260463 | A1 | 11/2005 | Chapman et al. |
| 2006/0204806 | A1* | 9/2006 | Takada ................ H01M 8/0267 429/434 |
| 2007/0104997 | A1 | 5/2007 | Kim et al. |
| 2009/0092870 | A1 | 4/2009 | Ogawa et al. |
| 2009/0130510 | A1 | 5/2009 | Ishikawa et al. |

FOREIGN PATENT DOCUMENTS

| | | | |
|---|---|---|---|
| JP | 2001-229946 A | | 8/2001 |
| JP | 2003-173807 A | | 6/2003 |
| JP | 2003173807 A | * | 6/2003 |
| JP | 2004-39322 A | | 2/2004 |
| JP | 2004-055346 A | | 2/2004 |
| JP | 2005-293893 A | | 10/2005 |
| JP | 2005-293907 A | | 10/2005 |
| JP | 2007-103344 A | | 4/2007 |
| JP | 2007-149630 A | | 6/2007 |
| JP | 2007-157621 A | | 6/2007 |
| JP | 2007-165186 A | | 6/2007 |
| JP | 2007-517369 A | | 6/2007 |
| JP | 2007-280801 A | | 10/2007 |
| JP | 2008-10347 A | | 1/2008 |
| JP | 2008-108536 A | | 5/2008 |
| RU | 2 076 405 C1 | | 3/1997 |
| RU | 2 087 740 C1 | | 8/1997 |
| RU | 2 235 511 C1 | | 7/2004 |
| RU | 2 249 887 C2 | | 4/2005 |
| RU | 2 335 829 C2 | | 10/2008 |
| RU | 2336600 C1 | | 10/2008 |
| WO | WO 99/66579 A1 | | 12/1999 |
| WO | WO 2007/119621 A1 | | 10/2007 |

OTHER PUBLICATIONS

European Search Report; Apr. 4, 2014, 9 pages.
Russian Decision on Grant, Oct. 17, 2013, 9 pages.
Russian Decision on Grant, Feb. 11, 2014, 17 pages.
Chinese Office Action, Oct. 11, 2014, 6 pages.
USPTO Office Action, U.S. Appl. No. 14/742,113, dated Jun. 6, 2017, 13 pages.

* cited by examiner (a)

GAS FLOW CHANNEL DIRECTION

HEIGHT DIRECTION (b)

GAS FLOW CHANNEL DIRECTION

HEIGHT DIRECTION (c)

GAS FLOW CHANNEL DIRECTION

HYDROGEN CONCENTRATION (a)

(b)

(a)

(b)

(a)

(b)

FUEL CELL SYSTEM AND METHOD FOR CONTROLLING SAME

TECHNICAL FIELD

The present invention relates to a fuel cell system.

BACKGROUND ART

Conventionally, such a fuel cell system is known as is provided with a fuel cell where a fuel gas (for example, hydrogen) is supplied to a fuel electrode and an oxidant gas (for example, air) is supplied to an oxidant electrode to thereby make an electrochemical reaction of these gases, thus implementing a power generation.

With respect to the fuel cell system of the above type, nitrogen included in the air is permeated to the fuel electrode side, so that the fuel electrode has a portion having a high nitrogen concentration, that is, a portion having a low hydrogen concentration. The thus caused gas unevenness is a cause for deteriorating members included in the fuel cell. Then, Patent Literature 1 discloses a method of changing gas pressures of the fuel electrode and oxidant electrode to thereby purge the water of the fuel cell and the accumulated unreactive gas.

CITATION LIST

Patent Literature

[Patent Literature 1]
Japanese Patent Publication No. 2007-517369 {JP2007517369(T)}

SUMMARY OF INVENTION

Technical Problem

However, with respect to the method disclosed in the Patent Literature 1, a pressure change with a relatively large pressure width is necessary for purging the liquid water and unreactive gas. Thereby, a large stress may be applied to electrolyte membranes included in the fuel cell, thus causing such a possibility as may deteriorate durability of the fuel cell.

The present invention has been made in view of the above circumstances. It is an object of the present invention to suppress unevenness of reactive gas while suppressing durability deterioration of the fuel cell.

Moreover, it is another object of the present invention to suppress the stress caused in the fuel cell or fuel gas supply components to thereby suppress deterioration of the fuel cell system.

Solution to Problem

A fuel cell system according to an aspect of the present invention comprises: a fuel cell for generating a power by causing an electrochemical reaction between an oxidant gas supplied to an oxidant electrode and a fuel gas supplied to a fuel electrode; a fuel gas supplier for supplying the fuel gas to the fuel electrode; and a controller for controlling the fuel gas supplier to thereby supply the fuel gas to the fuel electrode, the controller being configured to implement a pressure change when an outlet of the fuel electrode side is closed, wherein based on a first pressure change pattern for implementing the pressure change at a first pressure width, the controller periodically changes a pressure of the fuel gas at the fuel electrode.

A method of controlling a fuel cell system according to the aspect of the present invention comprises: generating a power by causing an electrochemical reaction between an oxidant gas supplied to an oxidant electrode and a fuel gas supplied to a fuel electrode; supplying the fuel gas to the fuel electrode; and controlling the supplying operation of the fuel gas to thereby supply the fuel gas to the fuel electrode, and implementing a pressure change when an outlet of the fuel electrode side is closed, wherein based on a first pressure change pattern for implementing the pressure change at a first pressure width, the controlling operation periodically changes a pressure of the fuel gas at the fuel electrode.

A fuel cell system according to the aspect of the present invention comprises: a fuel cell for generating a power by causing an electrochemical reaction between an oxidant gas supplied to an oxidant electrode and a fuel gas supplied to a fuel electrode; a fuel gas supplying means for supplying the fuel gas to the fuel electrode; and a means for controlling the fuel gas supplying means to thereby supply the fuel gas to the fuel electrode, the controlling means being configured to implement a pressure change when an outlet of the fuel electrode side is closed, wherein based on a first pressure change pattern for implementing the pressure change at a first pressure width, the controlling means periodically changes a pressure of the fuel gas at the fuel electrode.

Advantageous Effects of Invention

According to the present invention, periodically changing a pressure of a fuel gas at a fuel electrode based on the first pressure change pattern which implements pressure change at the first pressure width can agitate the fuel electrode side gas. With this, the fuel electrode side gas can be made even.

Moreover, according to the present invention, the fuel gas supply quantity in the implementation period of one control pattern is increased, thus it is possible to suppress increase in the number of implementations of the pressure rise-fall per unit period. With this, a stress applied to the fuel cell or fuel gas supply components can be relieved, thus it is possible to suppress deterioration of the fuel cell system.

DESCRIPTION OF EMBODIMENTS

First Embodiment

Figure 1:
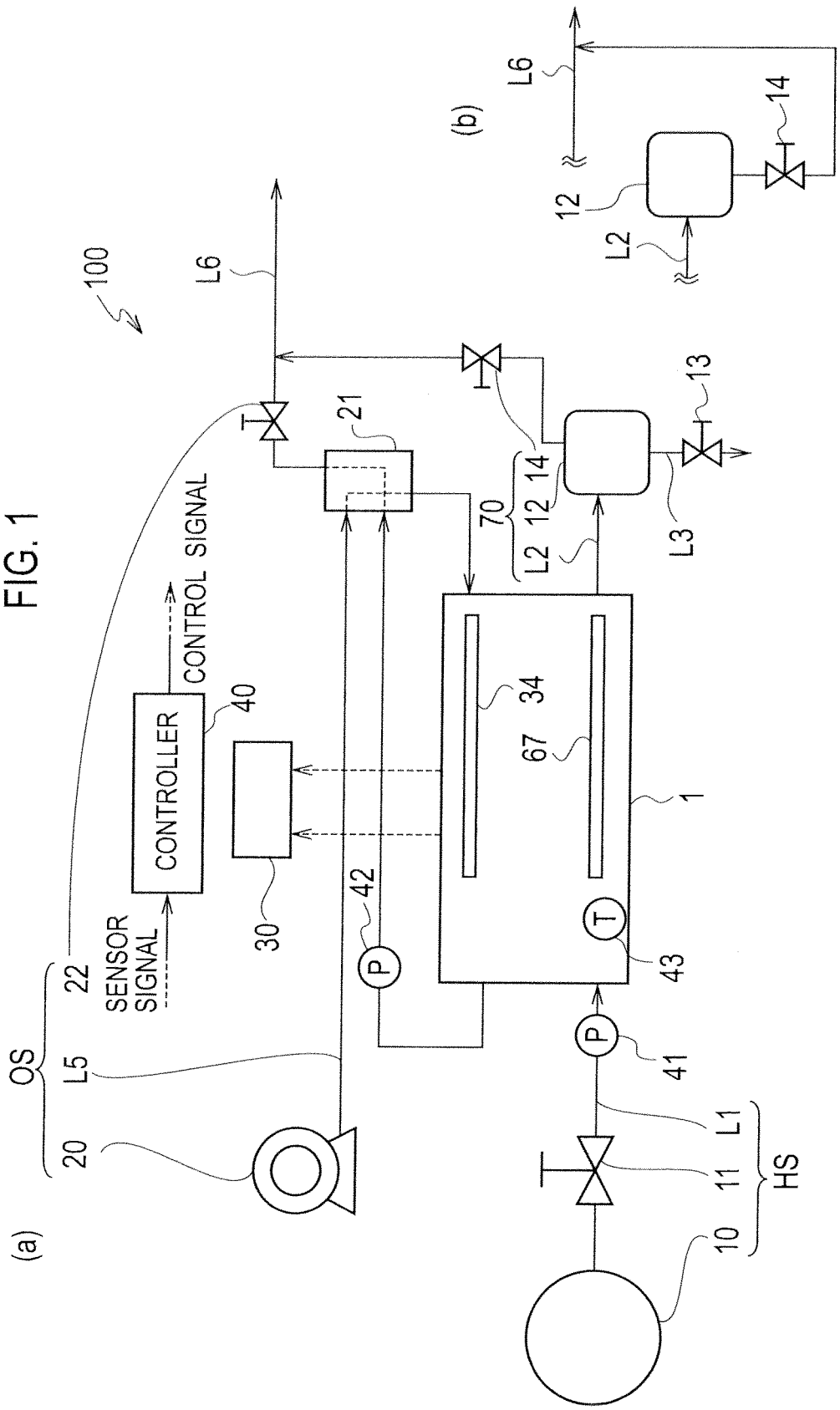
FIG. 1(a) is a block diagram schematically showing a structure of the fuel cell system according to the first embodiment.
FIG. 1(b) is a block diagram schematically showing another structure of the fuel cell system according to the first embodiment.

FIG. 1(a) is a block diagram schematically showing a structure of a fuel cell system 100 according to the first embodiment of the present invention. The fuel cell system 100 is installed, for example, in a vehicle that is a mobile object, where the vehicle is driven by an electric power supplied from the fuel cell system 100.

The fuel cell system 100 is principally provided with a fuel cell stack 1 including a plurality of stacked fuel cells. Each of the fuel cells included in the fuel cell stack 1 is so formed that a fuel cell structure is sandwiched between a pair of separators, where the fuel cell structure has such a structure that a fuel electrode 67 (refer to after-described FIG. 4) and an oxidant electrode 34 (refer to after-described FIG. 4) sandwich therebetween a solid polymer electrolyte membrane.

In the fuel cell stack 1, corresponding to each of the fuel gas and the oxidant gas, a pair of internal flow channels are so formed as to extend in a stack direction of the fuel cell. Of the pair of the internal flow channels (manifolds) corresponding to the fuel gas; with respect to a supply internal flow channel as the first internal flow channel, a fuel gas is supplied to each of the fuel electrode 67 side reaction surfaces via the fuel electrode 67 side gas flow channels (cell flow channels) of the individual fuel cells, while with respect to a discharge internal flow channel as the second internal flow channel, a gas (hereinafter referred to as "fuel electrode off-gas") discharged from each of the fuel electrode 67 side gas flow channels of the individual fuel cells flows into the discharge internal flow channel. Likewise, of the pair of the internal flow channels corresponding to the oxidant gas; with respect to a supply internal flow channel as the first internal flow channel, an oxidant gas is supplied to each of the oxidant electrode 34 side reaction surfaces via the oxidant electrode 34 side gas flow channels (cell flow channels) of the individual fuel cells, while with respect to a discharge internal flow channel as the second internal flow channel, a gas (hereinafter referred to as "oxidant electrode off-gas") discharged from each of the oxidant electrode 34 side gas flow channels of the individual fuel cells flows into the discharge internal flow channel. The fuel cell stack 1 according to the first embodiment adopts what is called a counter flow method where the fuel gas and the oxidant gas flow in directions opposite to each other.

In each of the individual cells of the fuel cell stack 1, electrochemically reacting the fuel gas and the oxidant gas with each other, which gases are respectively supplied to the fuel electrode 67 and the oxidant electrode 34, generates an electric power.

According to the first embodiment, an explanation is made based on the case of using hydrogen as a fuel gas and air as an oxidant gas. In addition, in this specification, the languages "fuel cell," "fuel electrode" and "oxidant electrode" are not to be used only for designating a single fuel cell or its fuel electrode or oxidant electrode, but are also to be used for unanimously designating each of the fuel cells of the fuel cell stack 1 or their fuel electrodes or oxidant electrodes.

The fuel cell system 100 further includes a hydrogen system for supplying hydrogen to the fuel cell stack 1 and an air system for supplying air to the fuel cell stack 1.

In the hydrogen system, hydrogen as the fuel gas is stored in the fuel tank 10 (for example, a high pressure hydrogen cylinder), and is supplied from the fuel tank 10 to the fuel cell stack 1 via a hydrogen supply flow channel (fuel electrode inlet flow channel) L1. Specifically, the hydrogen supply flow channel L1 has the first end portion connected to the fuel tank 10 and the second end portion connected to an inlet side of the fuel gas supply internal flow channel of the fuel cell stack 1. In the hydrogen supply flow channel L1, a tank source valve (not shown in FIG. 1) is disposed at a downstream of the fuel tank 10. Rendering the tank source valve in an open state allows the high pressure hydrogen gas from the fuel tank 10 to be mechanically pressure-reduced to a predetermined pressure by means of a pressure-reducing valve (not shown in FIG. 1) disposed at the downstream of the fuel tank 10. The thus pressure-reduced hydrogen gas is further pressure-reduced by means of a hydrogen pressure adjusting valve 11 disposed at the further downstream of the pressure-reducing valve, and then is supplied to the fuel cell stack 1. The hydrogen pressure supplied to the fuel cell stack 1, that is, the hydrogen pressure in the fuel electrode 67 can be adjusted by controlling opening degree of the hydrogen pressure adjusting valve 11. According to the first embodiment, the fuel tank 10, the hydrogen supply flow channel L1 and the hydrogen pressure adjusting valve 11 which is disposed in the hydrogen supply flow channel L1 constitute a hydrogen supplier HS (fuel gas supplier HS) for supplying hydrogen to the fuel electrode 67 of the fuel cell stack 1.

According to the first embodiment, the fuel cell stack 1 has such a structure that an outlet side of the fuel gas discharge internal flow channel is basically closed, thus restricting the fuel electrode off-gas's discharge from the fuel cell stack 1, that is, the fuel cell stack 1 is included in the fuel cell system 100 which adopts what is called a closed system. Herein, the closed system does not mean an exact closed state. For discharging, from the fuel electrode 67, impurities such as inactive gas (nitrogen and the like) and liquid water, there is disposed, as an exception, a discharge system capable of opening the outlet side of the fuel gas discharge internal flow channel. Specifically, a fuel electrode off-gas flow channel (discharge flow channel) L2 is connected to the outlet side of the fuel gas discharge internal flow channel. The fuel electrode off-gas flow channel L2 has the second end portion connected to an after-described oxidant electrode off-gas flow channel L6.

In the fuel electrode off-gas flow channel L2, a capacity portion (capacity device) 12 having a predetermined capacity Rs (see after-described FIG. 20) as a space is disposed, where the predetermined capacity Rs is, for example, equivalent to or about 80% of the fuel electrode 67 side capacity with respect to all fuel cells included in the fuel cell stack 1. The capacity portion 12 functions as a buffer for primarily storing impurities included in the fuel electrode off-gas entering from the fuel electrode 67 side. In FIG. 1, a discharge water flow channel L3 having an open first end portion is connected to the capacity portion 12's lower portion in a vertical direction, and a discharge water valve 13 is provided for the discharge water flow channel L3. The impurities (mainly, liquid water) contained in the fuel electrode off-gas entering the capacity portion 12 is stored in the lower part of the capacity portion 12. Controlling the open-closed state of the discharge water valve 13 can discharge the thus stored impurities. Moreover, in the fuel electrode off-gas flow channel L2, a purge valve (shutter) 14 is disposed on a downstream of the capacity portion 12. The fuel electrode off-gas entering the capacity portion 12, specifically, the gas including the impurities (mainly, inactive gas such as nitrogen) and unreacted hydrogen can be discharged by controlling the open-closed state of the purge valve 14.

The fuel electrode off-gas flow channel (discharge flow channel) L2, the capacity portion (capacity device) 12 and the purge valve (shutter) 14 form a limiter 70.

Meanwhile, the air as the oxidant gas of the air system is to be set forth. For example, air is compressed when an atmosphere is taken in by means of a compressor 20, thereby supplying the air to the fuel cell stack 1 by way of an air supply flow channel L5. The air supply flow channel L5 has the first end portion connected to the compressor 20 and the second end portion connected to the inlet side of an oxidant gas supply internal flow channel of the fuel cell stack 1. Moreover, an air supply flow channel L5 has a humidifier 21 for humidifying the air supplied to the fuel cell stack 1.

In the fuel cell stack 1, an oxidant electrode off-gas flow channel L6 is connected to the outlet side of the oxidant gas discharge internal flow channel. With this, the oxidant electrode off-gas from the oxidant electrode 34 in the fuel cell stack 1 is discharged outside by way of the oxidant electrode off-gas flow channel L6. The oxidant electrode off-gas flow channel L6 has the above-described humidifier 21, thus removing the water generated by the generation (this removed water is used for humidifying the supply air). Moreover, in the oxidant electrode off-gas flow channel L6, an air pressure adjusting valve 22 is disposed on the downstream of the humidifier 21. Adjusting the opening degree of the air pressure adjusting valve 22 can control the air pressure supplied to the fuel cell stack 1, that is, the air pressure of the oxidant electrode 34. According to the first embodiment, the compressor 20, the air supply flow channel L5, and the air pressure adjusting valve 22 which is disposed in the oxidant electrode off-gas flow channel L6 constitute an oxidant gas supplier OS for supplying the air to the oxidant electrode 34 of the fuel cell stack 1.

Moreover, an output takeout device 30 for controlling an output (for example, current) taken out from the fuel cell stack 1 is connected to the fuel cell stack 1. By way of the output takeout device 30, the power generated in the fuel cell stack 1 is supplied, for example, to a vehicle-driving electric motor (not shown in FIG. 1), a secondary battery and various accessories necessary for the generation operation of the fuel cell stack 1. Moreover, the power generated by the output takeout device 30 is also supplied to the secondary battery (not shown in FIG. 1). This secondary battery is provided for supplementing shortage of the power supplied from the fuel cell stack 1 in such occasions as to start the fuel cell system 100 or in a transient response of the fuel cell system 100.

A controller (control device) 40 functions to administratively control the entire fuel cell system 100. By operating according to a control program, the controller 40 controls operation conditions of the fuel cell system 100. A microcomputer including main components such as CPU, ROM, RAM and I/O interface can be used as the controller 40. According to the control program stored in the ROM, the controller 40 implements various calculations. Then, to various actuators (not shown in FIG. 1), the controller 40 outputs such calculation results as control signals. With this, the controller 40 controls various elements such as the hydrogen pressure adjusting valve 11, the discharge water valve 13, the purge valve 14, the compressor 20, the air pressure adjusting valve 22 and the output takeout device 30, to thereby implement the generation operation of the fuel cell stack 1.

For detecting conditions of the fuel cell system 100, sensor signals from various sensors and the like are input to the controller 40. According to the first embodiment, the above various sensors include a hydrogen pressure sensor 41, an air pressure sensor 42, and a stack temperature sensor 43. The hydrogen pressure sensor 41 detects the hydrogen pressure supplied to the fuel cell stack 1, the air pressure sensor 42 detects the air pressure supplied to the fuel cell stack 1, and the stack temperature sensor 43 detects the temperature of the fuel cell stack 1.

According to the first embodiment, the controller 40 controls the fuel cell system 100 in the following manner. Firstly, the controller 40 supplies air and hydrogen to the fuel cell stack 1, to thereby implement the generation by the fuel cell stack 1. The pressure (operation pressure) of each of the air and the hydrogen which are supplied to the fuel cell stack 1 is set in advance either at a certain standard value which is constant irrespective of operation load or at variable values which are variable according to the operation load. Then, the controller 40 supplies the air and hydrogen at a predetermined operation pressure, to thereby implement the generation of the fuel cell stack 1. Herein, as one feature of the first embodiment, when supplying the hydrogen to the fuel electrode 67 of the fuel cell stack 1, the controller 40 periodically changes the hydrogen pressure in the fuel electrode 67 of the fuel cell stack 1, based on the first pressure change pattern for implementing the pressure change at the first pressure width (differential pressure) and the second pressure change pattern for implementing the pressure change at the second pressure width (differential pressure) larger than the first pressure width. Specifically, the controller 40 repeatedly implements basic control patterns, that is, a plurality of the first pressure change patterns, followed by the second pressure change pattern. When implementing the pressure change, the controller 40 stops hydrogen supply to the fuel cell stack 1, and on the condition that the hydrogen pressure in the fuel electrode 67 of the fuel cell stack 1 is decreased by the predetermined pressure width (first pressure width or second pressure width), the controller 40 restarts the hydrogen supply to the fuel cell stack 1, to thereby allow the hydrogen pressure in the fuel electrode 67 of the fuel cell stack 1 to return to the operation pressure. Opening and closing of the hydrogen pressure adjusting valve 11 accomplish the stop and restart of the hydrogen supply to the fuel cell stack 1. Referring to the value detected by the hydrogen pressure sensor 41 can monitor the hydrogen pressure drop which is equivalent to the pressure width.

Moreover, FIG. 1(b) is a block diagram schematically showing another structure of the fuel cell system 100 according to the first embodiment of the present invention. Herein, the structure abolishes the discharge water valve 13, leaving the purge valve 14 only. With the above structure, controlling the open-close condition of the purge valve 14 can discharge the gas included in the fuel electrode off-gas, that is, the gas including the impurities (mainly, inactive gas such as nitrogen, and liquid water) and unreacted hydrogen.

Hereinafter, concept of the fuel cell system 100 adopting the above structure and control method is to be set forth.

In view of improved fuel economy and decrease of driving power of various accessories for operating the fuel cell stack, operating the fuel cell system 100 at a low stoichiometric ratio (otherwise referred to as "low reactive gas supply excess ratio") and at a low flow rate lowers the flow velocity of the reactive gas (hydrogen or air) flowing in the gas flow channel (cell flow channel) in each of the fuel cells of the fuel cell stack 1. With this, impurities unnecessary for the generation reaction, for example, liquid water or an unreactive gas (mainly, nitrogen) are likely to be accumulated in the gas flow channel, which may prevent distribution of the reactive gas necessary for the generation. In this case, the output of the fuel cell stack 1 is lowered and the generation is disabled, in addition, the catalyst necessary for reaction may possibly be deteriorated.

For example, a condition for the fuel cell stack 1 to implement the generation by the following operations is to be taken into account: supplying air to the oxidant electrode 34 of the fuel cell stack 1; restricting the fuel electrode off-gas's discharge from the fuel cell stack 1; and constantly supplying hydrogen by an amount equivalent to hydrogen consumed in the fuel electrode 67. In the individual fuel cell, nitrogen in air makes a cross leak to the fuel electrode 67 side gas flow channel from the oxidant electrode 34 side gas flow channel by way of the solid polymer electrolyte membrane included in the fuel cell. Meanwhile, to the fuel electrode 67 side gas flow channel, hydrogen in equivalent to hydrogen consumed by the generation reaction flows by convection current. However, since the outlet side of the fuel gas discharge internal flow channel is closed, the thus cross-leaked nitrogen is pushed into the downstream side (outlet side) of the gas flow channel by the convection of hydrogen. Nitrogen of the fuel electrode 67 is not consumed by the generation reaction. On top of that, nitrogen leak from the oxidant electrode 34 continuously increases the nitrogen in the fuel electrode 67 until the oxidant electrode 34 side partial pressure is equal to the fuel electrode 67 side partial pressure.

Figure 2:
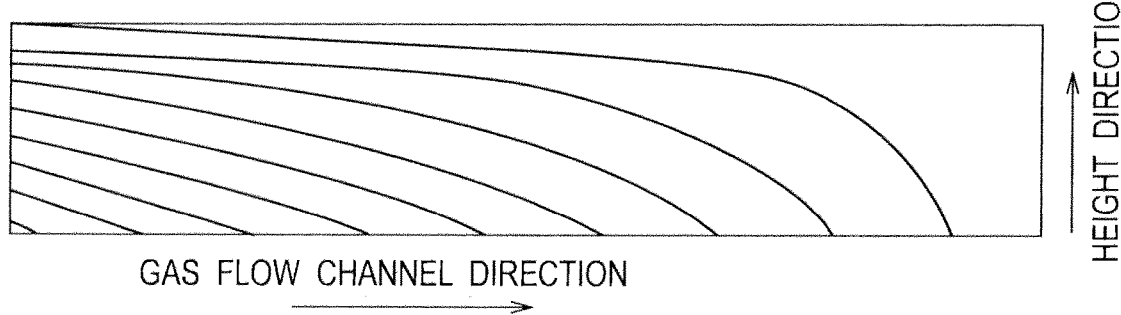
FIG. 2(a) is explanatory view showing a state of hydrogen on the fuel electrode side in the fuel cell, showing hydrogen streamlines in the fuel electrode side gas flow channel.
FIG. 2(b) shows the hydrogen concentration distribution in the fuel electrode side gas flow channel.
FIG. 2(c) shows the hydrogen concentration distribution on the fuel electrode side reaction surface.
Figure 2:
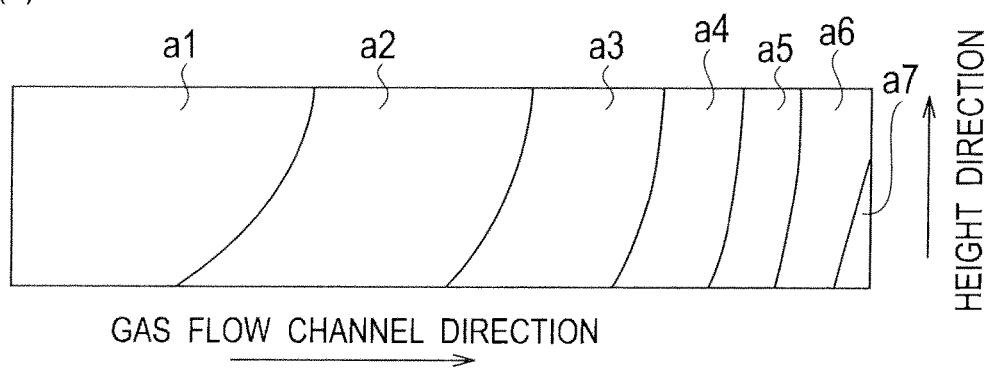
Figure 2:
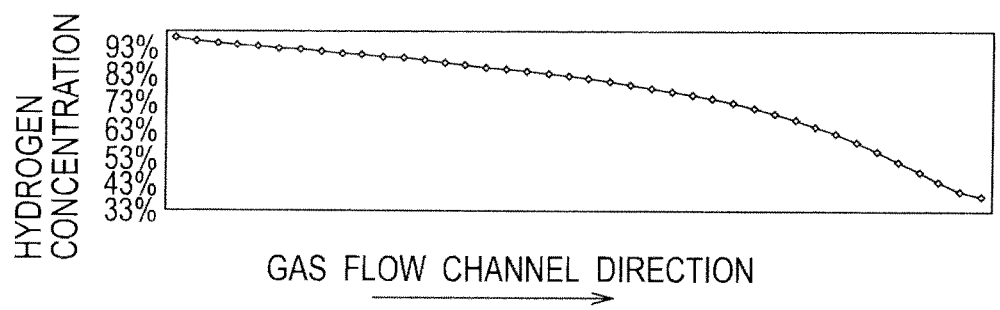

FIG. 2(a) to FIG. 2(c) are explanatory views showing states of the fuel electrode 67 side hydrogen in the fuel cell. FIG. 2(a) shows hydrogen streamlines in the fuel electrode 67 side gas flow channel. Herein, the abscissa axis denotes a distance (in gas flow channel direction) of the gas flow channel, where the left side of the abscissa axis corresponds to the inlet side of the gas flow channel and the right side of the abscissa axis corresponds to the outlet side of the gas flow channel. Meanwhile, the ordinate axis denotes a height of the gas flow channel, where the lower side of the ordinate axis corresponds to the reaction surface. Moreover, FIG. 2(b) shows hydrogen concentration distribution in the fuel electrode 67 side gas flow channel. Like FIG. 2(a), the abscissa axis denotes the distance (in gas flow channel direction) of the gas flow channel, while the ordinate axis denotes the height of the gas flow channel. In FIG. 2(b), an area a1 denotes a hydrogen concentration range of 93% to 100%, an area a2 denotes the hydrogen concentration range of 83% to 93%, and an area a3 denotes the hydrogen concentration range of 73% to 83%. Moreover, an area a4 denotes the hydrogen concentration range of 63% to 73%, an area a5 denotes the hydrogen concentration range of 53% to 63%, an area a6 denotes the hydrogen concentration range of 43% to 53%, and an area a7 denotes the hydrogen concentration range of 33% to 43%. Moreover, FIG. 2(c) shows the hydrogen concentration distribution on the fuel electrode 67 side reaction surface. Herein, the abscissa axis denotes the distance of the gas flow channel, where the left side of the abscissa axis corresponds to the inlet side of the gas flow channel while the right side of the abscissa axis corresponds to the outlet side of the gas flow channel. Meanwhile, the ordinate axis denotes the hydrogen concentration.

As stated above, the cross leaked nitrogen's inflow and the inflow hydrogen allow the fuel electrode 67 to have a portion where the nitrogen concentration is high, i.e., a portion where the hydrogen concentration is low. Specifically, in the fuel cell, the further downstream side (outlet side) of the gas flow channel has a tendency to further decrease the hydrogen concentration. Moreover, continuing the generation from such a state further decreases the hydrogen concentration of the portion where the hydrogen concentration is low.

Figure 3:
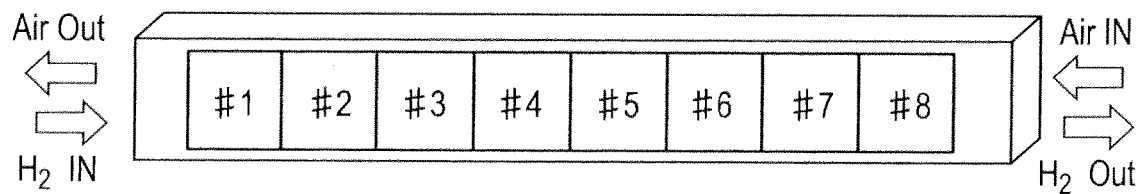
FIG. 3(a) is an explanatory view schematically showing the fuel cell, assuming eight current measurement points.
FIG. 3(b) shows time-series transition of the current distribution at an individual measurement point.
Figure 3:
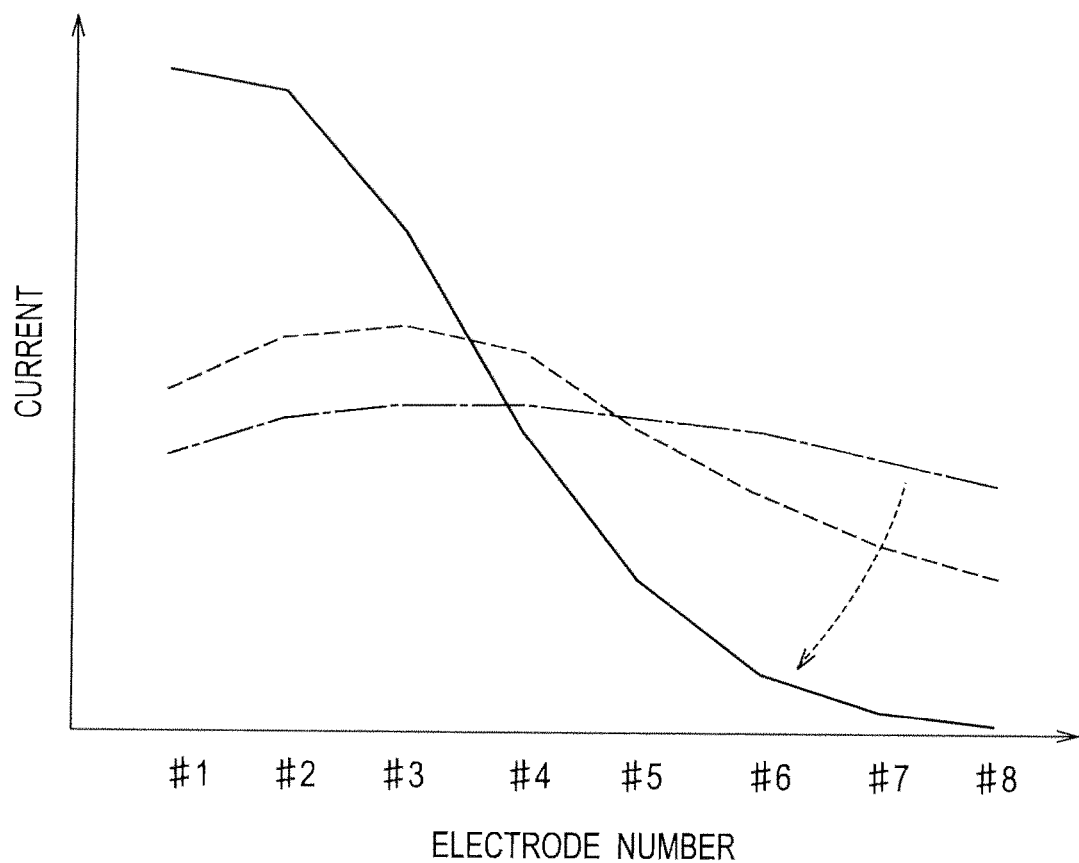

FIG. 3 is an explanatory view schematically showing the fuel cell. As shown in FIG. 3(a), along the flow of the reactive gas, eight current measurement points #1 to #8 are respectively assumed in the power generation surface of the fuel cell. FIG. 3(b) shows time-series transition of the current distribution at the individual measurement point #1 to #8. Specifically, as denoted by a broken line arrow, the current distribution transition in each of the measurement points #1 to #8 is shifted from the one-dot chain line to the broken line and to the solid line. That is, in the initial generation step, the hydrogen concentration in the gas flow channel is substantially even, therefore, as denoted by the one-dot chain line, the current values at the measurement points #1 to #8 are substantially equal to each other. However, continuously implementing the generation decreases the hydrogen concentration on the outlet side of the gas flow channel, thus, as denoted by the broken line or the solid line, the current values on the outlet side of the gas flow channel drop and a current concentration is caused on the inlet side of the gas flow channel. In such states, it is difficult to continue the stable generation and the generation may possibly be finally disabled. Moreover, since the above local current drop is difficult to detect, as the case may be, the output from the fuel cell stack is continuously taken with the current drop unnoticed.

Figure 4:
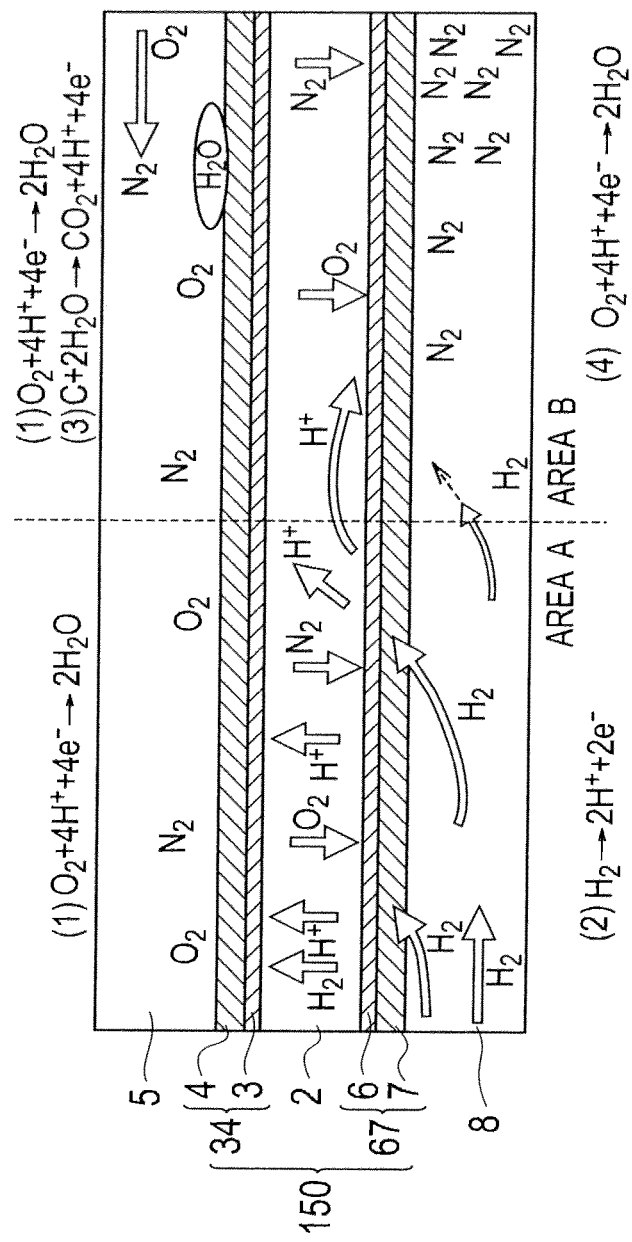
FIG. 4 is a cross sectional view schematically showing the structure of the fuel cell.

FIG. 4 is a cross sectional view schematically showing the structure of the fuel cell. The fuel cell structure 150 included in the fuel cell has such a structure that the solid polymer electrolyte membrane 2 is sandwiched between the fuel electrode 67 and the oxidant electrode 34 which two electrodes (reactive electrodes) are pairwise. The solid polymer electrolyte membrane 2 includes, for example, an ion conductive macromolecular membrane such as a fluorine resin ion exchange membrane, and functions as an ion conductive electrolyte membrane through water saturation. The oxidant electrode 34 includes a platinum-based catalytic layer 3 carrying thereon a catalyst such as platinum and a gas diffusion layer 4 including a porous body such as carbon fiber. The electrode 67 includes a platinum-based catalytic layer 6 carrying thereon a catalyst such as platinum and a gas diffusion layer 7 including a porous body such as a carbon fiber. Moreover, the separators (not shown in FIG. 4) sandwiching therebetween the fuel cell structure 150 from both sides respectively have gas flow channels 5, 8 for supplying the reactive gases (hydrogen and air) to the individual reactive electrodes.

When the generation is continued, oxygen simultaneously with nitrogen leak from the oxidant electrode 34 side to the fuel electrode 67 side, thereby oxygen moves to the fuel electrode 67 side. Moreover, water generated by the generation reaction is present in the oxidant electrode 34 side. Moreover, the gas diffusion layer 4 or the separator (not shown in Fig.), that is, the members included in the gas flow channel in the fuel cell or the members for supporting the catalyst mainly include carbon. With this, the following reactions are promoted in the area (area B in FIG. 4) where the hydrogen is in short supply:

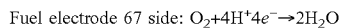

Fuel electrode 67 side: $O_2 + 4H^+ + 4e^- \rightarrow 2H_2O$

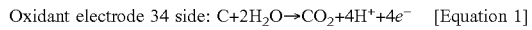

Oxidant electrode 34 side: $C + 2H_2O \rightarrow CO_2 + 4H^+ + 4e^-$ [Equation 1]

Referring to the equation 1, carbon in the structure of the fuel cell reacts with water generated on the oxidant electrode 34 side, to thereby generate carbon dioxide on the oxidant electrode 34 side. This signifies that the structure in the fuel cell is eroded. Carbon included in each of an element forming the gas flow channel, a structure carrying thereon a catalyst for causing the reaction, a structure of the gas diffusion layer 4, and a structure of the separator changes to carbon dioxide, thus leading to deterioration of the fuel cell.

Moreover, the following operations are also seen on the fuel electrode 67. A reverse diffusion phenomenon moves the generation reaction water from the oxidant electrode 34 side to the solid polymer electrolyte membrane 2, or the condensed water in the hydrogen which is humidified and supplied is, as the case may be, stored in the gas flow channel. In the case where the liquid water in a form of water drop is present in the gas flow channel, no substantial problem is caused. However, in the case where the liquid water in a form of membrane spreads widely to thereby cover a gas flow channel face of the gas diffusion layer 7, the liquid water prevents the hydrogen supply to the reaction surface, thus causing portions with low hydrogen concentration. This may lead to the deterioration of the fuel cell, like the above case on the oxidant electrode 34 side.

The inconvenience caused by the liquid water in the gas flow channel is generally recognized, and a method for discharging the liquid water is implemented. However, without the liquid water, the fuel cell is deteriorated. That is, the deterioration phenomenon of the fuel cell (catalyst) is caused by a shortage of hydrogen in the fuel electrode 67, and therefore it is important to suppress occurrence of such a hydrogen shortage portion (for example, a portion of about 5% or less in volume concentration). Herein, a cause for lowering the hydrogen concentration in the gas on the fuel electrode 67 side is that nitrogen contained in the gas on the oxidant electrode 34 side permeates to the fuel electrode 67 side. Thereby, it is necessary to properly obtain nitrogen permeation quantity. Therefore, at first, nitrogen permeation quantity (leak nitrogen quantity permeating through solid macromolecular membrane) per unit time relative to each of physical quantities (nitrogen partial pressure, temperature, and humidity) was checked through experimentations or simulations, with the results shown in FIG. 5 and FIG. 6.

Figure 5:
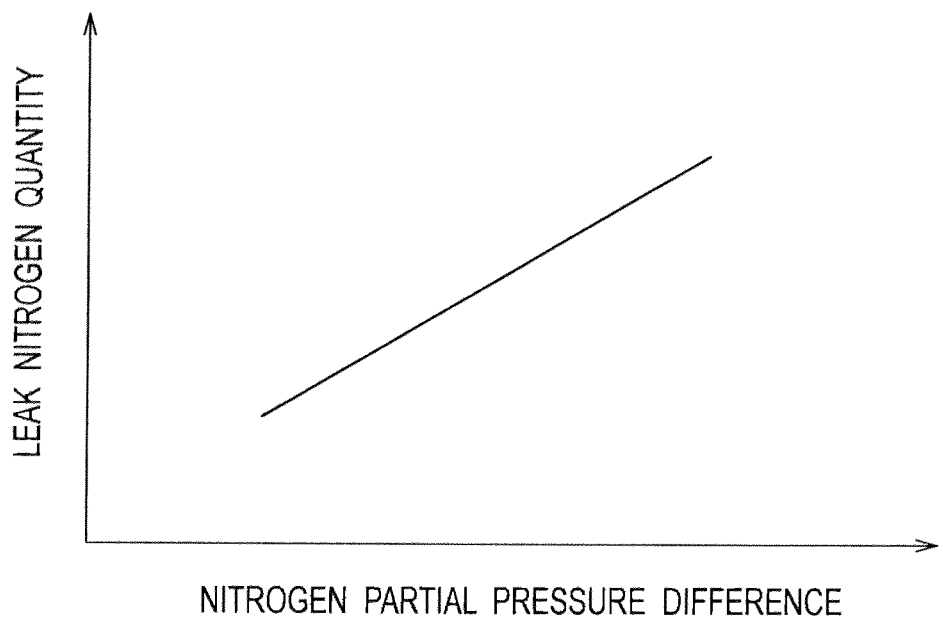
FIG. 5 is an explanatory view showing a leak nitrogen quantity relative to nitrogen partial pressure difference between the oxidant electrode and the fuel electrode.
Figure 6:
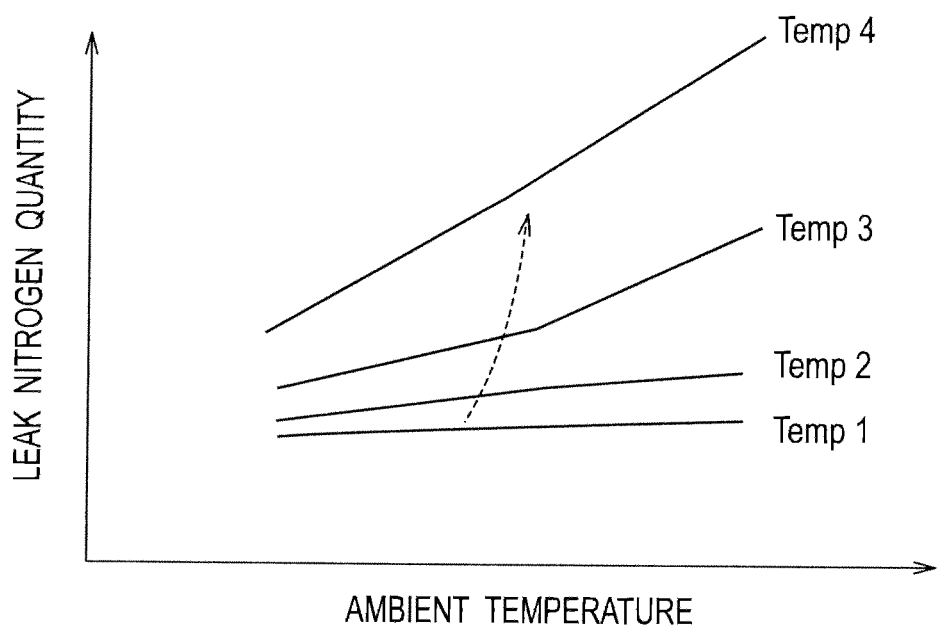
FIG. 6 is an explanatory view showing the relation between an ambient humidity and a leak nitrogen quantity according to an ambient temperature.

FIG. 5 is an explanatory view showing leak nitrogen quantity relative to nitrogen partial pressure difference between the oxidant electrode 34 and the fuel electrode 67. FIG. 6 is an explanatory view showing the relation between an ambient humidity and a leak nitrogen quantity according to ambient temperatures, where as denoted by a broken line arrow, the leak nitrogen quantity relative to the ambient humidity is increased according to an increase in the ambient temperature, that is, Temp1, Temp2, Temp3 and Temp4. As shown in FIG. 5, the nitrogen quantity permeating from the oxidant electrode 34 side to the fuel electrode 67 side (leak nitrogen quantity) is larger as the nitrogen partial pressure difference is larger. Moreover, as shown in FIG. 6, the nitrogen quantity permeating from the oxidant electrode 34 side to the fuel electrode 67 side (leak nitrogen quantity) is larger as the humidity and temperature at the fuel electrode 67 are higher.

As set forth above, in the fuel cell, the nitrogen permeated to the fuel electrode 67 rides on the flow of the supplied hydrogen and then stays in such a manner as to be pushed into the downstream side (outlet side). Then, according to the present first embodiment, causing a forced convection current to agitate hydrogen with nitrogen suppresses occurrence of the shortage portion where the hydrogen concentration is locally low.

Figure 7:
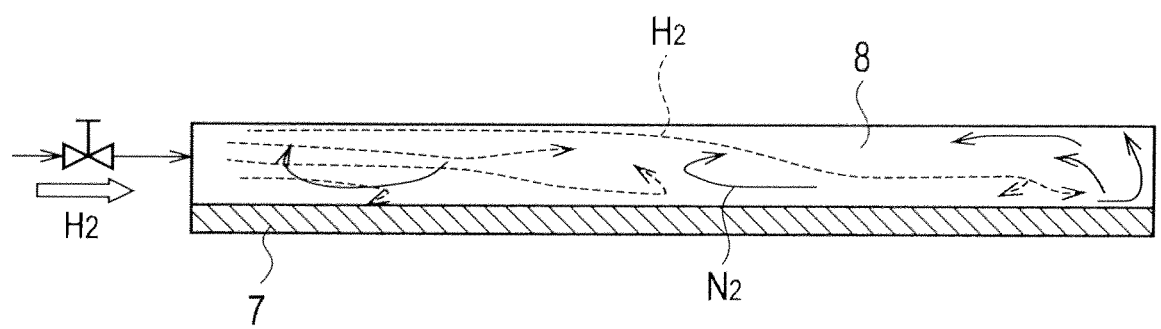
FIG. 7(a) is an explanatory view schematically showing an agitation state of hydrogen with the unreactive gas.
FIG. 7(b) shows a timing for stopping the hydrogen supply (valve closing operation).
Figure 7:
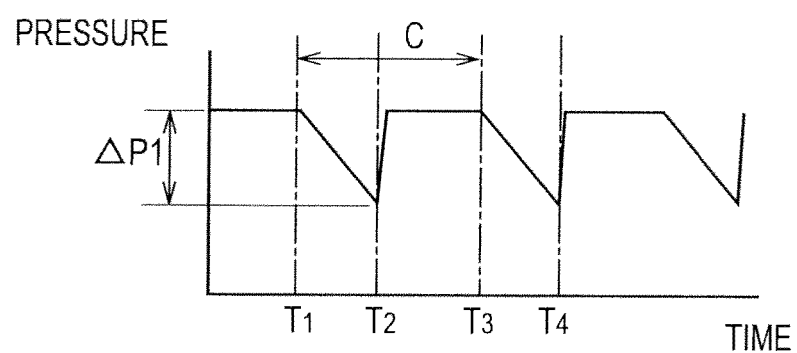

FIG. 7 is an explanatory view schematically showing an agitation state of hydrogen with the unreactive gas (mainly, nitrogen). As a method for implementing agitation by the forced convection current, for example, the hydrogen pressure on the fuel electrode 67 side of the fuel cell stack 1 is rendered lower than the hydrogen supply pressure, to thereby cause a predetermined differential pressure between inside and outside of the fuel cell stack 1. Then, momentarily releasing the predetermined differential pressure can momentarily secure a large supply quantity (flow velocity) of hydrogen flowing into the fuel cell stack 1. With this, as shown in FIG. 7(a), the agitation between hydrogen and nitrogen becomes possible. When a turbulent flow is obtained, an effect of the agitation is larger although such effect depends on the size of the gas flow channel in the fuel cell. Moreover, even in the case of a laminar flow, since nitrogen is pushed to the capacity portion 12 disposed at a downstream of the fuel cell stack 1 in the hydrogen system, the gas in the fuel cell is replaced with hydrogen. Moreover, since the pressure is lowered in the entire gas flow channel, hydrogen can be distributed to the entire area of the gas flow channel until the pressure of the fuel electrode 67 becomes equal to the supply pressure.

For obtaining a constant differential pressure, it is also possible to supply hydrogen to the fuel cell stack 1 in generating power while momentarily causing a large pressure. However, for more easily obtaining the differential pressure, as shown in FIG. 7(*b*), the hydrogen supply is stopped by means of the hydrogen pressure adjusting valve 11 (closing valve operation) at a timing T1 while continuing the generation of the fuel cell stack 1. Then, a keeping time is set until a predetermined differential pressure (pressure width) ΔP1 is obtained, to thereby secure the differential pressure. After the predetermined differential pressure ΔP1 is obtained (timing T2), hydrogen is supplied by means of the hydrogen pressure adjusting valve 11 (opening valve operation). With this, a large supply quantity (flow velocity) is momentarily caused, which can implement the agitation. Moreover, repeating the above pressure change patterns (first pressure change pattern) at a period C implements the closing valve operation at a timing T3 and the opening valve operation at a timing T4. With this, hydrogen can be pulsatorily supplied. The differential pressure ΔP1 is, for example, in a range of 5 kPa to 8 kPa. In view of the fuel cell stack 1's characteristics, the gas's agitation characteristics, and the like, experiments or simulations can set the optimum value of the differential pressure ΔP1. The differential pressure ΔP1 necessary for the gas agitation is set smaller than the differential pressure necessary for an after-described liquid water discharge.

The above gas agitation can suppress the occurrence of the hydrogen shortage portion. However, in the case of the generation continuing for a long time, the generated water or condensed water is accumulated, thus blocking the fuel electrode 67 side gas flow channel in the fuel cell. Then, according to the present first embodiment, flowing hydrogen into the fuel electrode 67 discharges the liquid water which blocks the gas flow channel out of the fuel cell.

Figure 8:
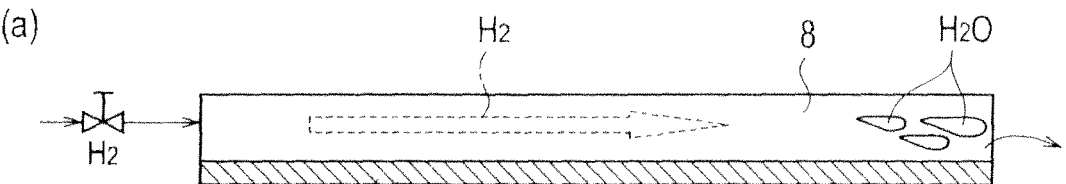
FIG. 8(a) is an explanatory view showing a liquid water discharge state.
FIG. 8(b) shows a timing for stopping the hydrogen supply (valve closing operation).
FIG. 8(c) shows another example of the timing for stopping the hydrogen supply (valve closing operation).
FIG. 8(d) shows still another example of the timing for stopping the hydrogen supply (valve closing operation).
Figure 8:
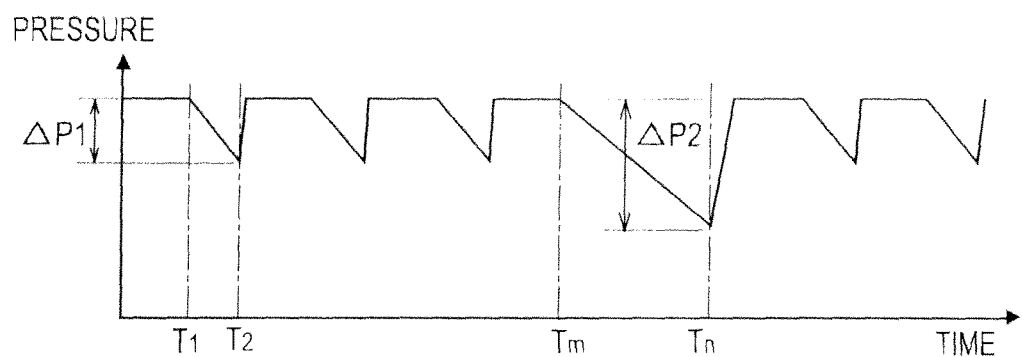
Figure 8:
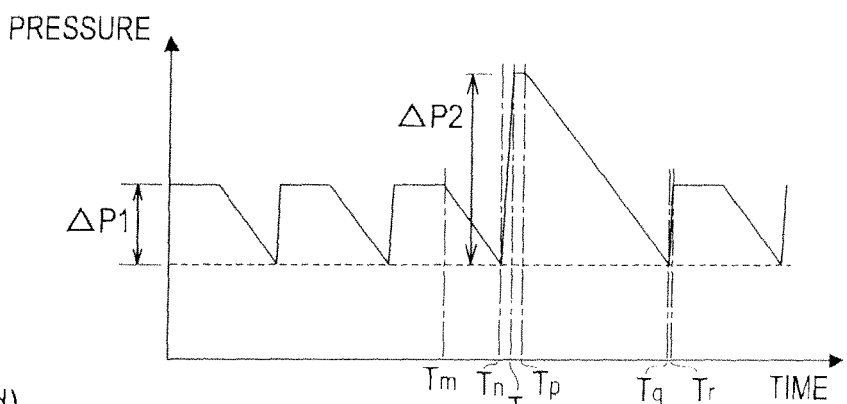
Figure 8:
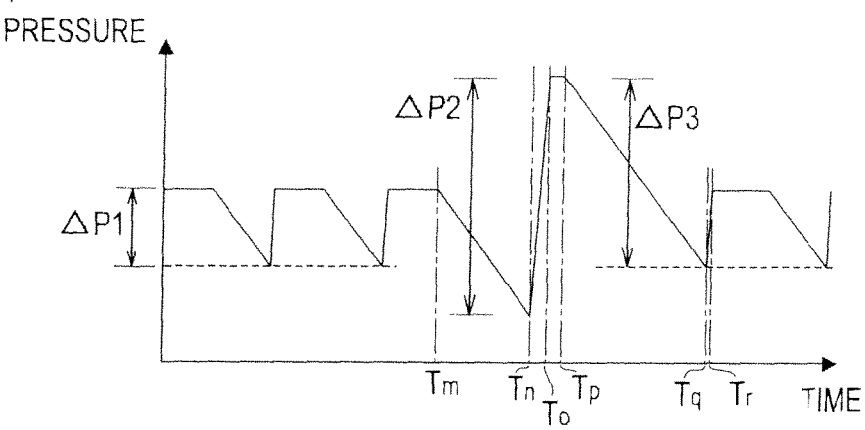

FIG. 8 is an explanatory view showing a liquid water discharge state. As a method of implementing the liquid water discharge by supplying hydrogen, for example, the hydrogen pressure on the fuel electrode 67 side of the fuel cell stack 1 is rendered lower than the hydrogen supply pressure, to thereby cause a predetermined differential pressure between inside and outside of the fuel cell stack 1. Then, momentarily releasing the constant differential pressure can momentarily secure a large supply quantity (flow velocity) of the fuel gas which flows into the fuel cell stack 1. With this, as shown in FIG. 8(*a*), the liquid water can be discharged from the gas flow channel.

The differential pressure necessary for the liquid water discharge is required to be larger than the differential pressure necessary for the above gas agitation. Meanwhile, the frequency required for the liquid water discharge is lower than the frequency required for the gas agitation. Then, as shown in FIG. 8(*b*), a plurality of pressure change patterns required for the gas agitation are implemented, then, at a timing Tm, the hydrogen supply is stopped by means of the hydrogen pressure adjusting valve 11 (closing valve operation). Then, a keeping time is set until a predetermined differential pressure (pressure width) ΔP2 is obtained, to thereby secure the differential pressure. After the differential pressure ΔP2 is obtained (timing Tn), hydrogen is supplied by means of the hydrogen pressure adjusting valve 11 (opening valve operation). With this, a large flow velocity is momentarily caused, thus the liquid water discharge can be implemented. Herein, the above pressure change pattern (second pressure change pattern) is periodically repeated, like the first pressure change pattern required for the gas agitation. However, compared with the first pressure pattern required for the gas agitation, the second pressure change pattern required for the liquid water discharge has lower implementation frequency. The differential pressure ΔP2 is, for example, in a range of 20 kPa to 30 kPa. In view of the fuel cell stack 1's characteristics, the liquid water discharge characteristics and the like, experiments or simulations can set the optimum value of the differential pressure ΔP2. The differential pressure ΔP2 required for the liquid water discharge is set larger than the differential pressure ΔP1 required for the above gas agitation.

Moreover, as shown in FIG. 8(*c*), a plurality of the pressure change patterns required for the gas agitation are implemented and then, at the timing Tm, the hydrogen supply is stopped by means of the hydrogen pressure adjusting valve 11 (closing valve operation). Then, a keeping time is set until the predetermined differential pressure (pressure width) ΔP1 is obtained, to thereby secure the differential pressure. After the differential pressure ΔP1 is obtained (timing Tn), the opening degree of the hydrogen pressure adjusting valve 11 is rendered larger than that at the timing Tm, to thereby supply the hydrogen (opening valve operation). With this, the gas is supplied at a pressure higher than the pressure at the timing Tm, to thereby cause the predetermined differential pressure (pressure width) ΔP2 (timing To). Then, at a timing Tp, the hydrogen supply is stopped by means of the hydrogen pressure adjusting valve 11 (closing valve operation). Then, a keeping time is set until the predetermined differential pressure (pressure width) ΔP2 is obtained, to thereby secure the differential pressure. After the differential pressure ΔP2 is obtained (timing Tq), hydrogen is supplied by means of the hydrogen pressure adjusting valve 11 (opening valve operation). At that time, it is preferable that hydrogen is supplied at the opening degree same as that at the timing Tm. Then, at a timing Tr, the pressure returns to the same pressure as that at the timing Tm. After the timing Tr, the pressure change patterns same as those before the timing Tm are implemented. Even in the case of the above operations, a large flow velocity is momentarily caused, so that the liquid water discharge can be implemented.

Moreover, as shown in FIG. 8(*d*), a plurality of pressure change patterns required for the gas agitation are implemented and then, at the timing Tm, the hydrogen supply is stopped by means of the hydrogen pressure adjusting valve 11 (closing valve operation). Then, a keeping time is set until a differential pressure larger than the predetermined differential pressure (pressure width) ΔP1 is obtained. When a differential pressure larger than the differential pressure ΔP1 is obtained (timing Tn), the opening degree of the hydrogen pressure adjusting valve 11 is rendered larger than that at the timing Tm, to thereby supply the hydrogen (opening valve operation). With this, the gas is supplied at the pressure higher than that at the timing Tm, to thereby cause the predetermined differential pressure (pressure width) ΔP2 (timing To). Next, at the timing Tp, the hydrogen supply is stopped by means of the hydrogen pressure adjusting valve 11 (closing valve operation). Then, a keeping time is set until a predetermined differential pressure (pressure width) ΔP3 is obtained, to thereby secure the differential pressure. Herein, it is preferable that the lower pressure limit at the obtaining of the differential pressure ΔP3 is set to the lower pressure limit at the obtaining of the differential pressure ΔP1. Next, after the differential pressure ΔP3 is obtained (timing Tq), hydrogen is supplied by means of the hydrogen pressure adjusting valve 11 (opening valve operation). At that time, it is preferable that hydrogen is supplied at the opening degree same as that at the timing Tm. Then, at the timing Tr, the pressure returns to the same pressure as that at the timing Tm. After the timing Tr, the pressure change patterns same as those before the timing Tm are implemented. Even when the above operations are implemented, a large flow velocity can be momentarily caused, to thereby implement the liquid water discharge.

As set forth above, according to the first embodiment, the controller 40 controls the fuel gas supplier HS (10, 11, L1), to thereby supply hydrogen to the fuel electrode 67 of the fuel cell stack 1, and based on the first pressure change pattern which implements the pressure change at the first pressure width $\Delta P1$ and on the second pressure change pattern which implements the pressure change at the second pressure width $\Delta P2$, the controller 40 periodically changes the hydrogen pressure in the fuel electrode 67 of the fuel cell stack 1.

With the above structure, the first pressure change pattern having a small pressure width is used in addition to the second pressure change pattern, to thereby be able to agitate the fuel electrode 67 side gas without applying a large stress to the individual fuel cell of the fuel cell stack 1. With this, the fuel electrode 67 side gas can be made even. Thereby, the fuel cell stack 1's deterioration attributable to the partial decrease of the hydrogen concentration can be suppressed. Moreover, providing the second pressure change pattern can discharge the liquid water and the like which cannot be discharged by the first pressure change pattern. With this, the fuel cell stack 1's deterioration attributable to the liquid water can be suppressed.

Moreover, the fuel cell system 100 of the first embodiment adopts the closed system where the fuel electrode off-gas discharged from the fuel electrode 67 side of the fuel cell stack 1 is restricted. With the above structure, impurities are likely to decrease the hydrogen concentration in the fuel electrode 67 side gas flow channel. However, implementing the above control can make the fuel electrode 67 side gas even.

Figure 9:
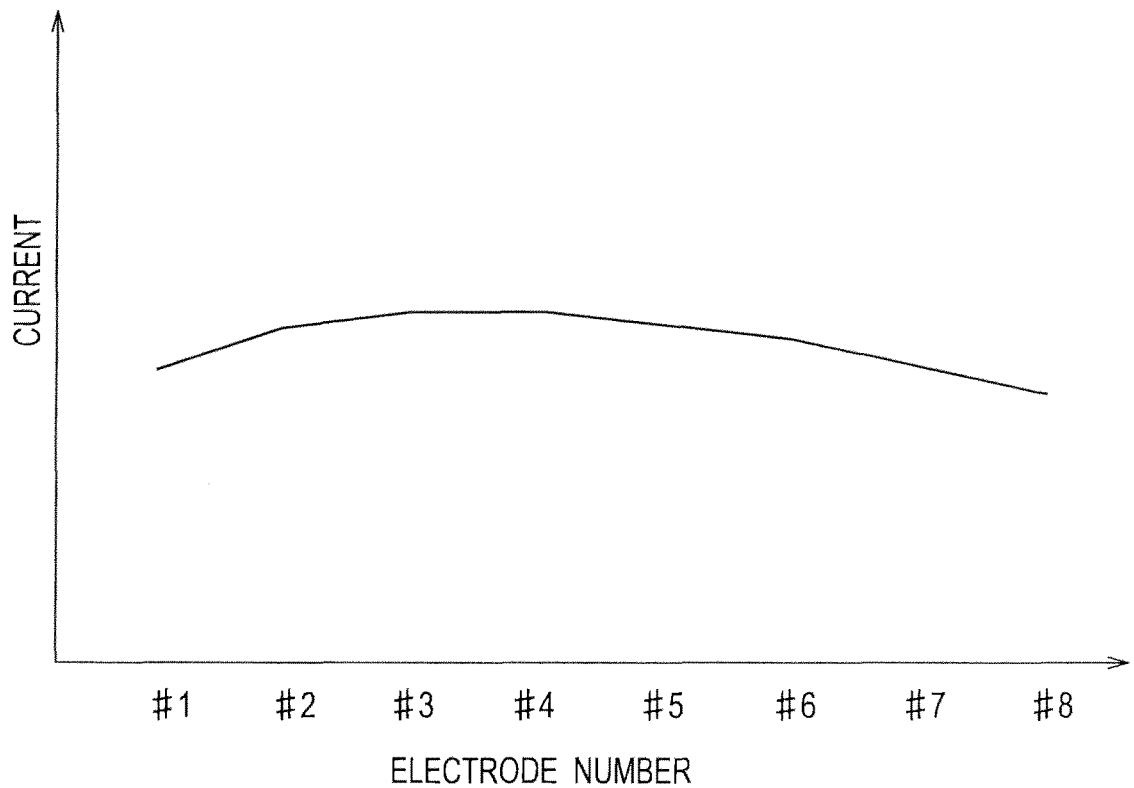
FIG. 9 is an explanatory view showing current distribution in the power generation surface.

Moreover, according to the first embodiment, the controller 40 implements the second pressure change pattern after implementing a plurality of first pressure change patterns. With the above structure, the frequency of applying a large stress to the individual cell of the fuel cell stack 1 can be decreased, while compatibly implementing the gas agitation and liquid water discharge on the fuel electrode 67 side. Moreover, since the implementation frequency of the first pressure change pattern which implements the gas agitation is high, the gas agitation can effectively be implemented even when the generation is continuously implemented. With this, as shown in FIG. 9, even when the generation is continuously implemented, the current value in the power generation surface is substantially equal, thus the current value drop on the outlet side of the gas flow channel and the current concentration on the inlet side of the gas flow channel can be suppressed.

Moreover, according to the first embodiment, the controller 40 stops the hydrogen supply to the fuel cell stack 1 in a state that the generation of the fuel cell stack 1 is implemented by supplying hydrogen at the predetermined operation pressure, moreover, on a condition that the hydrogen pressure of the fuel electrode 67 is decreased by the predetermined pressure width ($\Delta P1$, $\Delta P2$), the controller 40 restarts the hydrogen supply, to thereby change the hydrogen pressure in the fuel electrode 67. With the above structure, the hydrogen pressure adjusting valve 11 can easily implement the pressure change, so that a simple control system can be accomplished.

Moreover, the fuel cell system 100 of the first embodiment has the fuel electrode off-gas flow channel L2, the capacity portion 12 and the purge valve 14. In this case, the capacity portion 12 functions as a space (capacity Rs: after-described FIG. 20) for storing the fuel electrode off-gas from the fuel electrode 67 side, that is, nitrogen or liquid water. With this, though the fuel cell system 100 has substantially a closed system, opening the purge valve 14 when necessary can also discharge the impurities (such as nitrogen which is relatively increased) outside. That is, the nitrogen leak is caused until the nitrogen partial pressure difference is removed. However, when the hydrogen concentration is to be kept at more than or equal to the predetermined value on the fuel electrode 67 side, the flow rate corresponding to the leak quantity can be discharged outside. Herein, the flow rate in this case is sufficiently small, thus unlikely to cause an influence on the pressure change necessary for the gas agitation in the fuel electrode 67, and in addition, diluting by the oxidant electrode 34 off-gas can be easily implemented. However, the entire pressure on the fuel electrode 67 side may be increased such that the generation can be implemented even when the nitrogen partial pressure is brought into an equilibrium state. In this case, a simple closed system can be adopted.

Moreover, when the hydrogen supply is stopped, the speed at which the hydrogen pressure in the fuel electrode 67 is decreased is determined by the flow channel capacity in the fuel cell stack 1. When a rapid pressure decrease is not desired due to a request associated with controlling of the fuel cell system 100, changing the capacity of the hydrogen supply flow channel L1 to the fuel cell stack 1 or the capacity of the capacity portion 12 of the fuel electrode off-gas flow channel L2 can control the pressure change time.

Second Embodiment

Hereinafter, the fuel cell system 100 according to the second embodiment of the present invention is to be set forth. The fuel cell system 100 according to the second embodiment is different from the fuel cell system 100 according to the first embodiment in terms that the hydrogen quantity which is supplied to the fuel electrode 67 of the fuel cell stack 1 attributable to the pressure change by the pressure change pattern is variably set according to the operation condition of the fuel cell system 100. In addition, the structure of the fuel cell system 100 according to the second embodiment is the same as that according to the first embodiment, therefore repeated explanations are to be omitted and differences are to be mainly set forth below.

Figure 10:
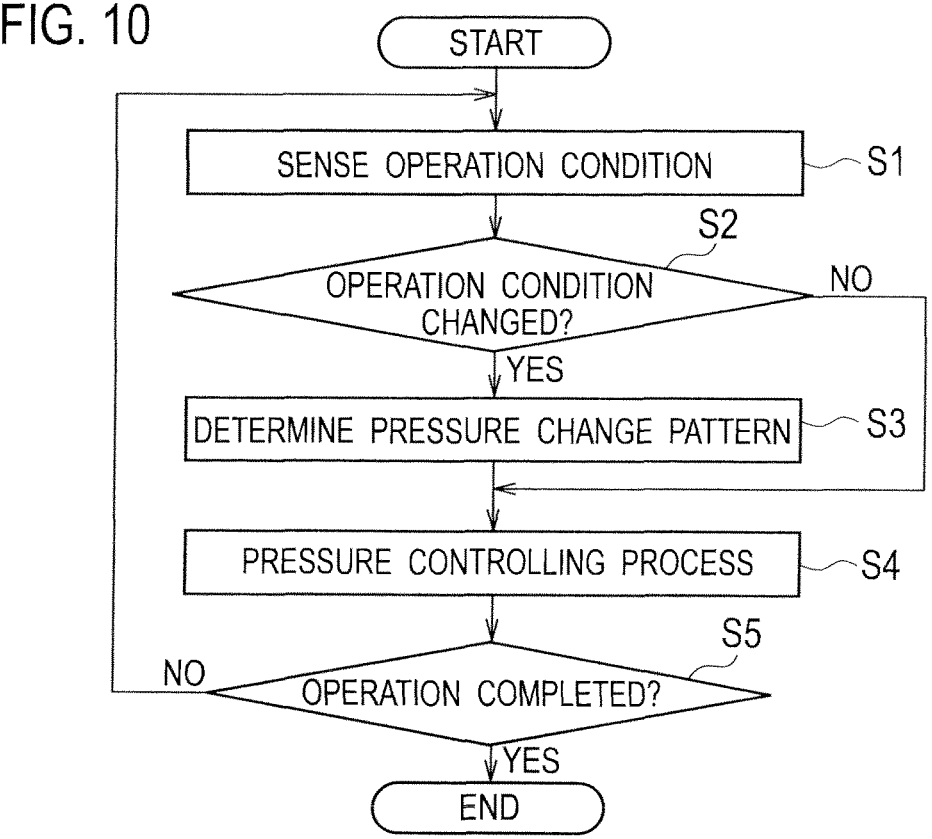
FIG. 10 is a flowchart showing process procedures of a method of controlling the fuel cell system according to the second embodiment.

FIG. 10 is a flowchart showing a control method of the fuel cell system 100 according to the second embodiment of the present invention, specifically, showing process procedures of a method of supplying hydrogen to the fuel electrode 67. The controller 40 implements the processes shown in this flowchart.

At first, at a step 1 (S1), the controller 40 detects the operation conditions of the fuel cell stack 1. The operation conditions detected at this step 1 include an operation load of the fuel cell stack 1, an operation temperature of the fuel cell stack 1, and an operation pressure of the fuel cell stack 1 (operation pressure of the oxidant electrode 34). In view of the vehicle side required power specified from the vehicle speed or acceleration opening degree, the required power of accessories, and the like, the operation load of the fuel cell stack 1 can be calculated. Moreover, the operation temperature of the fuel cell stack 1 can be detected by the stack temperature sensor 43. In terms of the operation pressure of the fuel cell stack 1, a certain standard value irrespective of the above operation load is set in advance, or variable values according to the operation load are set in advance. Therefore, by referring to these values, the operation pressure of the fuel cell stack 1 can be detected.

At a step 2 (S2), the controller 40 determines whether or not the operation condition thus detected at this time is changed compared to the operation condition detected in advance. When the determination is positive, that is, when the operation condition is changed, the routine proceeds to a step 3 (S3). Meanwhile, when the determination is negative in the step 2, that is, when the operation condition is not changed, the routine skips the process at the step 3, to thereby proceed to a step 4 (S4).

At the step 3, the controller 40 sets the pressure change pattern based on the operation condition. As set forth according to the first embodiment, the controller 40 implements a plurality of first pressure change patterns necessary for the gas agitation and then implements the second pressure change pattern necessary for the liquid water discharge. By repeating the first and second pressure change patterns as one set, the controller 40 implements the hydrogen supply. By the way, in the supply manner involving the pressure change, the hydrogen quantity supplied to the fuel electrode 67 attributable to the pressure change pulsatorily varies, thus applying repeated loads to the solid polymer electrolyte membrane 2, which acts as a stress. Then, in a scene where the cross leak from the oxidant electrode 34 is small, it is preferable that the hydrogen quantity supplied to the fuel electrode 67 attributable to the above pressure change is made small to thereby decrease the load applied to the solid polymer electrolyte membrane 2. Meanwhile, in a scene where the cross leak is large, it is preferable to positively implement the pressure change to thereby pulsatorily vary the hydrogen quantity supplied to the fuel electrode 67 attributable to the pressure change, thus implementing the gas agitation and liquid water discharge.

Ordinarily, the smaller the operation load of the fuel cell stack 1 is, the lower the operation temperature of the fuel cell stack 1 is, and the lower the operation pressure of the fuel cell stack 1 (specifically, operation pressure of the oxidant electrode 34) the smaller the cross leaked nitrogen quantity is. Then, when the operation condition is changed according to any of the above cases, the hydrogen quantity supplied to the fuel electrode 67 attributable to the pressure change is decreased. On the contrary, the larger the operation load of the fuel cell stack 1 is, the higher the operation temperature of the fuel cell stack 1 is, and the higher the operation pressure of the fuel cell stack 1 (specifically, operation pressure of the oxidant electrode 34) is; the larger the cross leaked nitrogen quantity is. Then, when the operation condition is changed according to any of the above cases, the hydrogen quantity supplied to the fuel electrode 67 attributable to the pressure change is increased.

For setting small the hydrogen quantity supplied to the fuel electrode 67 attributable to the pressure change, the basic control patterns are to be modified in the following manner.

Figure 11:
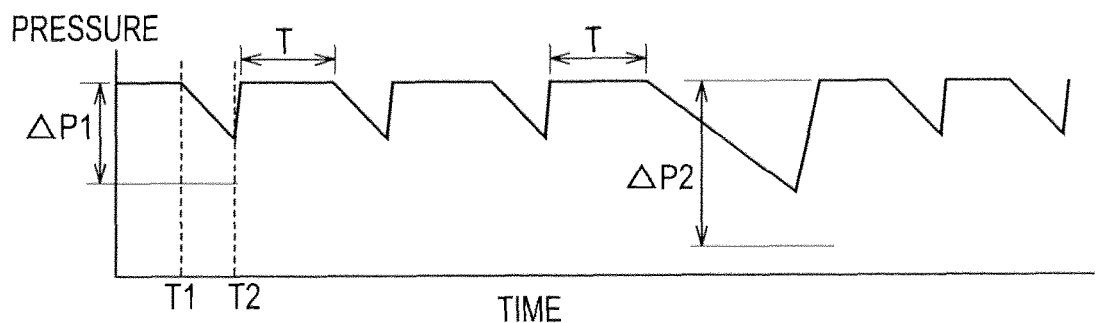
FIG. 11 is an explanatory view showing control patterns by the first control method.

As the first control method, as shown in FIG. 11, a valve closing time T of the hydrogen pressure adjusting valve 11 is set longer than the valve closing time of the basic control pattern. In other words, the basic control pattern is to be so modified that the implementation period of the pressure change is set longer.

Figure 12:
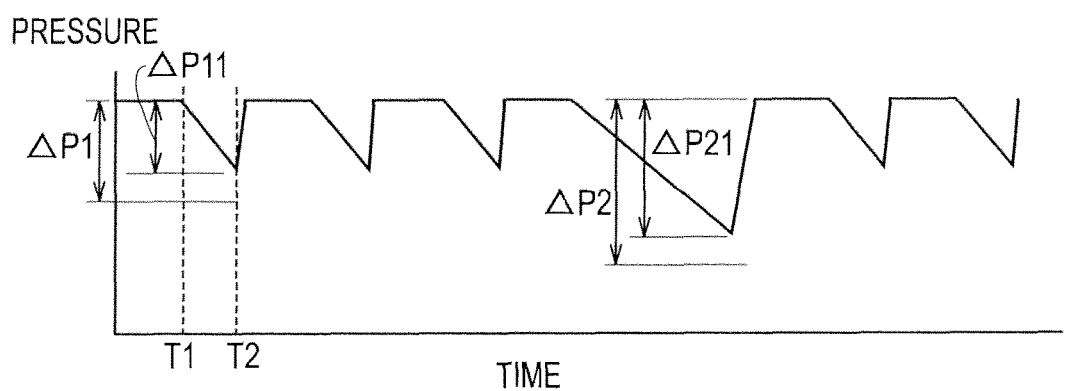
FIG. 12 is an explanatory view showing control patterns by the second control method.

As the second control method, as shown in FIG. 12, differential pressures (pressure widths) $\Delta P11$, $\Delta P21$ of the pressure control pattern are set smaller than the differential pressures (pressure widths) $\Delta P1$, $\Delta P2$ of the pressure control pattern in the basic control pattern.

Figure 13:
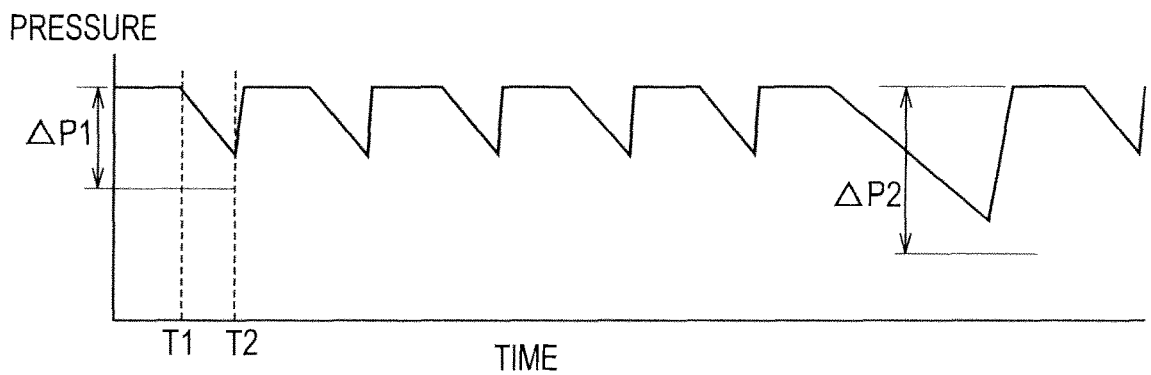
FIG. 13 is an explanatory view showing control patterns by the third control method.

As the third control method, as shown in FIG. 13, the implementation frequency of the second pressure change pattern (necessary for the liquid water discharge) relative to the first pressure change pattern (necessary for the gas agitation) is decreased compared with the implementation frequency of the second pressure change pattern of the basic control pattern.

Contrary to this, in the case of setting large the hydrogen quantity supplied to the fuel electrode 67 attributable to the pressure change, each of the first to third control methods is to be controlled in the opposite direction.

According to the changed operation conditions, the controller 40 modifies the basic control pattern based on any one of the first to third control methods or a combination thereof. Then, the controller 40 sets the thus modified control pattern as a present control pattern.

At the step 4, the controller 40 implements the hydrogen supply based on the control pattern which is presently set.

At a step 5 (S5), the controller 40 determines whether or not to end the operation of the fuel cell system 100. Specifically, the controller 40 determines whether or not an off-signal is input from an ignition switch. When the determination is positive at the step 5, that is, when the operation of the fuel cell system 100 is to be ended, the present control is ended. Meanwhile, when the determination is negative at the step 5, that is, when the operation of the fuel cell system 100 is not to be ended, the routine returns to the processes at the step 1.

As set forth above according to the second embodiment, with respect to the fuel cell system 100, the hydrogen quantity supplied to the fuel electrode 67 attributable to the pressure change is set small based on the operation condition of the fuel cell system 100. With the above structure, while the gas agitation and liquid water discharge of the fuel electrode 67 are implemented, it is possible to decrease the repeated loads to the individual fuel cell of the fuel cell stack 1.

Third Embodiment

Hereinafter, the fuel cell system 100 according to the third embodiment of the present invention is to be set forth. Herein, the structure of the fuel cell system 100 according to the third embodiment is like those according to the first and second embodiments, therefore repeated explanations are to be omitted and differences are to be mainly set forth.

The controller 40 controls the fuel cell system 100 in the following manner. The controller 40 supplies air and hydrogen to the fuel cell stack 1, to thereby implement the generation by the fuel cell stack 1. In this case, the controller 40 supplies air and hydrogen such that the pressure of each of air and hydrogen which are supplied to the fuel cell stack 1 becomes a predetermined operation pressure. This operation pressure is set, for example, as a certain standard value irrespective of the power generated by the fuel cell stack 1, or set as variable values according to the power generated by the fuel cell stack 1.

Figure 14:
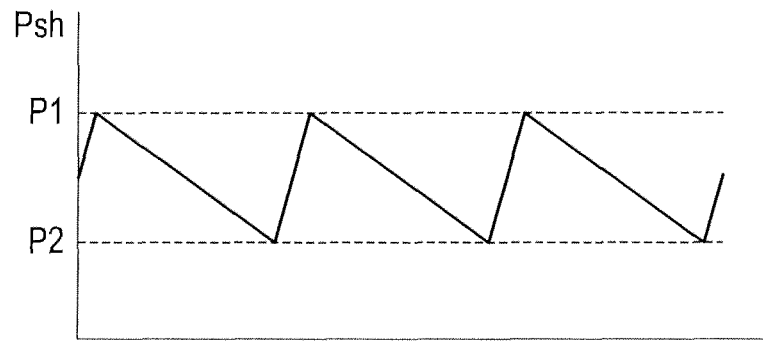
FIG. 14 is an explanatory view showing a transition of pressure rise-fall in the fuel electrode.

According to the third embodiment, in terms of the air supply to the oxidant electrode 34, the controller 40 implements the pressure control according to the predetermined operation pressure. Meanwhile, in terms of the hydrogen supply to the fuel electrode 67, the controller 40 controls the supply-stop of hydrogen according to the control patterns for implementing the pressure rise-fall within the range between an upper limit pressure P1 and a lower limit pressure P2. Then, the controller 40 repeats operations according to the control pattern, to thereby as shown in FIG. 14, supply hydrogen to the fuel electrode 67 while periodically changing the hydrogen pressure in the fuel electrode 67 of the fuel cell stack 1.

Specifically, on the condition that the hydrogen pressure of the fuel electrode 67 reaches the upper limit pressure P1 and the hydrogen concentration sufficient for implementing the generation is secured in the fuel electrode 67, the controller 40 controls the hydrogen pressure adjusting valve 11 to the minimum opening degree, to thereby stop the hydrogen supply to the fuel cell stack 1. When from the fuel cell stack 1 by way of the output takeout device 30, the controller 40 continues to take out a load current which corresponds to the load required by the fuel cell system 100, hydrogen is consumed by the generation reaction, to thereby lower the hydrogen pressure of the fuel electrode 67.

Next, on the condition that the hydrogen pressure of the fuel electrode 67 is decreased to the lower limit pressure P2, the controller 40 controls the hydrogen pressure adjusting valve 11 to the maximum opening degree, to thereby restart the hydrogen supply to the fuel cell stack 1. With this, the hydrogen pressure in the fuel electrode 67 is increased. Then, on the condition that the hydrogen pressure reaches (comes back to) the upper limit pressure P1, the controller 40 controls the hydrogen pressure adjusting valve 11 to the minimum opening degree, to thereby stop again the hydrogen supply. By repeating the above series of processes as one-cycle control pattern, the controller 40 supplies hydrogen to the fuel electrode 67 of the fuel cell stack 1 while periodically changing the hydrogen pressure.

Herein, the upper limit pressure P1 and the lower limit pressure P2 are respectively set based on, for example, a specified operation pressure. It is possible to monitor the hydrogen pressure of the fuel electrode 67 of the fuel cell stack 1 by referring to values detected by the hydrogen pressure sensor 41. Moreover, for increasing the pressure, it is desired that the hydrogen pressure on the upstream side of the hydrogen pressure adjusting valve 11 is set sufficiently high in advance to thereby increase a pressure-increasing speed as high as possible. For example, the pressure increase period from the lower limit pressure P2 to the upper limit pressure P1 is set to be in a range from 0.1 sec to about 0.5 sec. Meanwhile, the time from the upper limit pressure P1 to the lower limit pressure P2 is in a range from 1 sec to about 10 sec. however, the above time depends on the upper limit pressure P1, the lower limit pressure P2 and the current value taken out of the fuel cell stack 1, that is, the hydrogen consumption speed.

In the hydrogen supply control involving the above periodical pressure rise-fall, as one of the features of the third embodiment, a first keeping time Tp1 and a second keeping time Tp2 for keeping the pressure of the fuel electrode 67 respectively at the upper limit pressure P1 and the lower limit pressure P2 can be set to the control pattern. The controller 40 can arbitrarily set the first keeping time Tp1 and second keeping time Tp2 in a range from zero to a predetermined value.

Figure 15:
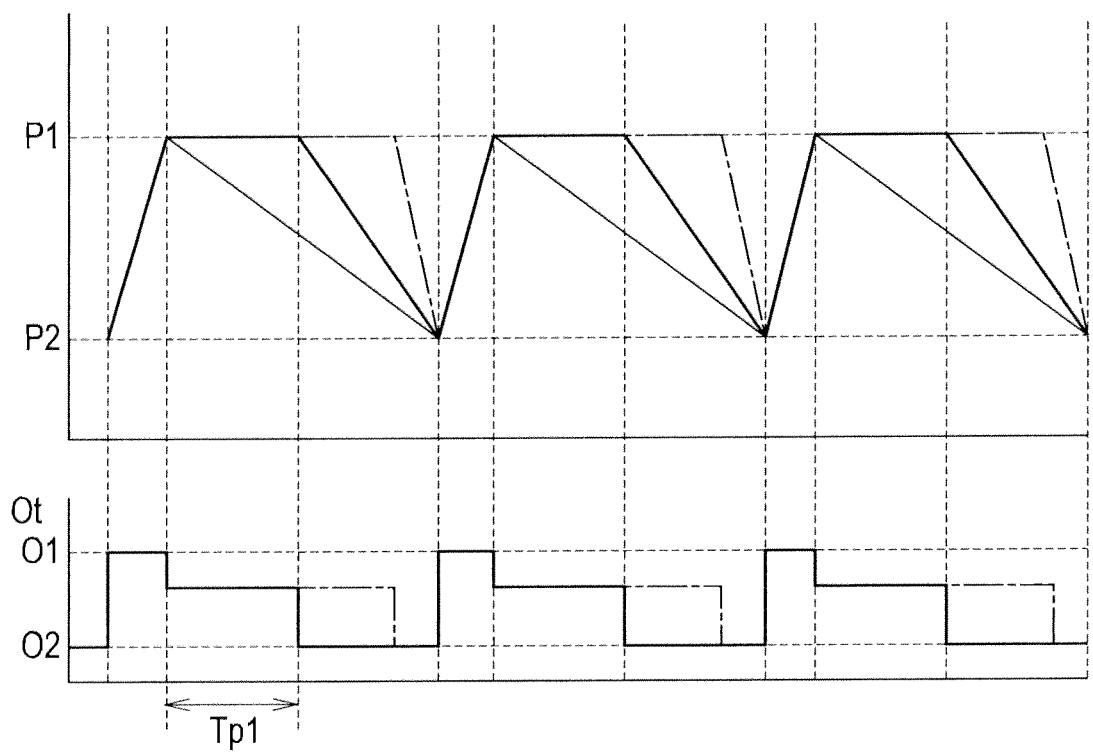
FIG. 15 is an explanatory view of the first keeping time Tp1.

As shown in FIG. 15, the first keeping time Tp1 is a time for keeping the pressure of the fuel electrode 67 at the upper limit pressure P1 before implementing the first process for decreasing the pressure of the fuel electrode 67 from the upper limit pressure P1 to the lower limit pressure P2. Specifically, on the condition that the pressure of the fuel electrode 67 is decreased to the lower limit pressure P2, the controller 40 controls the opening degree Ot of the hydrogen pressure adjusting valve 11 to the maximum opening degree O1, to thereby restart the hydrogen supply to the fuel cell stack 1, thus increasing the pressure of the fuel electrode 67. On the condition that the pressure of the fuel electrode 67 reaches the upper limit pressure P1, the controller 40 decreases the opening degree at of the hydrogen pressure adjusting valve 11 from the maximum opening degree O1 to a predetermined opening degree, to thereby keep the pressure of the fuel electrode 67 at the upper limit pressure P1. Then, on the condition that the first keeping time Tp1 elapsed from the timing at which the pressure of the fuel electrode 67 reaches the upper limit pressure P1, the controller 40 controls the opening degree Ot of the hydrogen pressure adjusting valve 11 to the minimum opening degree O2, to thereby stop the hydrogen supply to the fuel cell stack 1.

Figure 16:
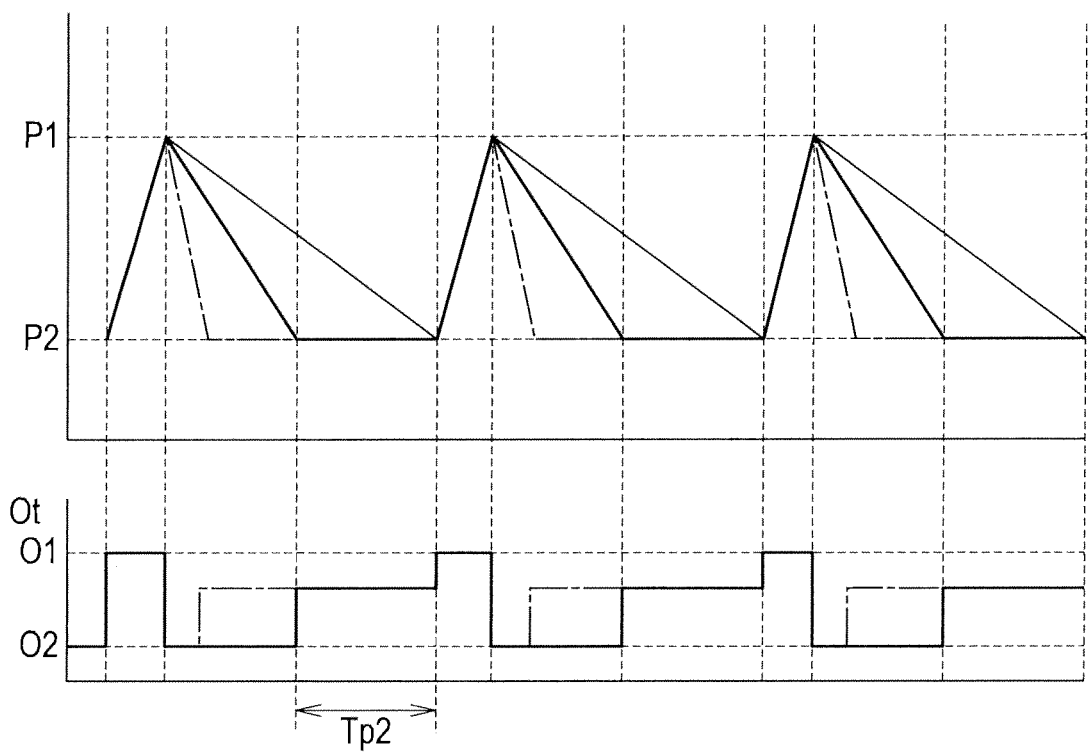
FIG. 16 is an explanatory view of the second keeping time Tp2.

Contrary to the above, as shown in FIG. 16, the second keeping time Tp2 is a time for keeping the pressure of the fuel electrode 67 at the lower limit pressure P2 before implementing the second process for increasing the hydrogen pressure of the fuel electrode 67 from the lower limit pressure P2 to the upper limit pressure P1. Specifically, on the condition that the pressure of the fuel electrode 67 reaches the upper limit pressure P1, the controller 40 controls the opening degree Ot of the hydrogen pressure adjusting valve 11 to the minimum opening degree O2, to thereby stop the hydrogen supply to the fuel cell stack 1. On the condition that the hydrogen pressure of the fuel electrode 67 is deceased to the lower limit pressure P2, the controller 40 increases the opening degree Ot of the hydrogen pressure adjusting valve 11 from the minimum opening degree O2 to a predetermined opening degree, to thereby keep the pressure of the fuel electrode 67 at the lower limit pressure P2. Then, on the condition that the second keeping time Tp2 elapsed from the timing at which the pressure of the fuel electrode 67 reaches the lower limit pressure P2, the controller 40 controls the opening degree Ot of the hydrogen pressure adjusting valve 11 to the maximum opening degree O1, to thereby restart the hydrogen supply to the fuel cell stack 1, thus increasing the pressure of the fuel electrode 67.

Figure 17:
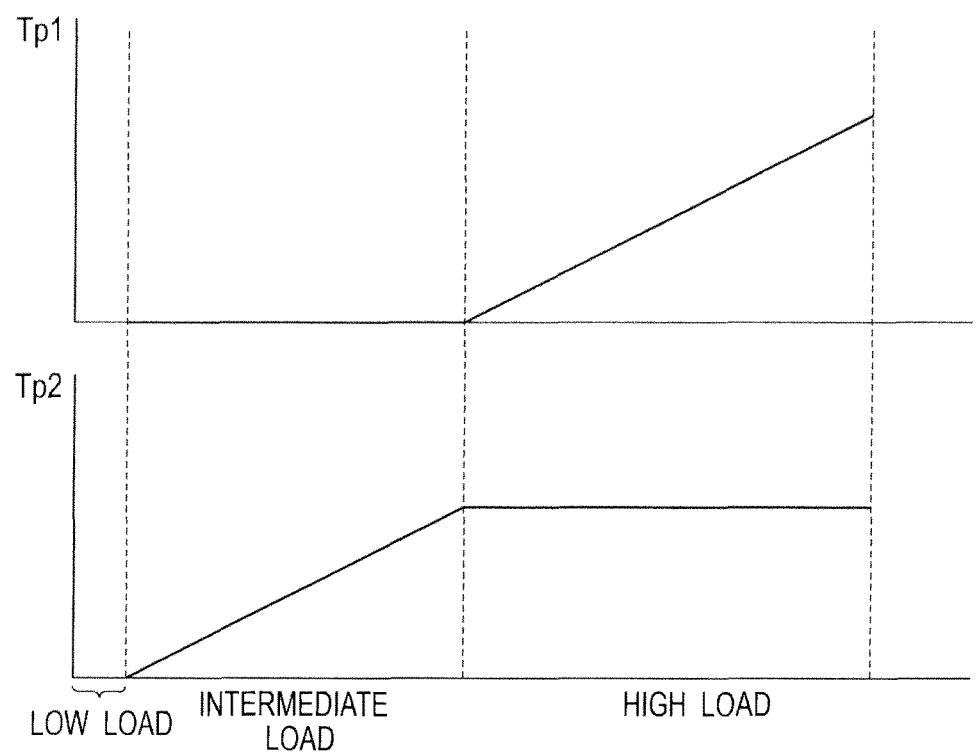
FIG. 17 is an explanatory view showing the load relative to each of the first keeping time Tp1 and the second keeping time Tp2.

FIG. 17 is an explanatory view showing the load relative to each of the first keeping time Tp1 and the second keeping time Tp2. For example, in the case of a low load (for example, a condition of taking out the load current up to about ⅓ of a rated load current) as an operation scene of the fuel cell system 100, each of the first keeping time Tp1 and the second keeping time Tp2 is set at zero. Then, in the case of an intermediate load (for example, a condition of taking out the load current larger than about ⅓ to smaller than about ⅔ of the rated load current), the first keeping time Tp1 is set at zero while the second keeping time Tp2 is so set as to be increased as the load is higher with zero as a start point. Moreover, in the case of a high load (for example, a condition of taking out the load current larger than or equal to about ⅔ of the rated load current), the first keeping time Tp1 is so set as to be increased as the load is higher with zero as a start point while the second keeping time Tp2 is set constant. In this way, the controller 40 can determine the first keeping time Tp1 and the second keeping time Tp2 according to the load conditions. In other words, according to the load, the controller 40 can select whether to keep the pressure of the fuel electrode 67 at the upper limit pressure P1 or at the lower limit pressure P2.

As set forth above, according to the third embodiment, as shown in FIG. 17, when the required load is high (load current is large), the controller 40 increases the hydrogen supply quantity in the implementation period of one control pattern, compared with when the required load is low (load current is small). In the operation scene such as high load, the hydrogen consumption quantity is likely to be large. Therefore, for covering the hydrogen supply, the number of implementations of the pressure rise-fall corresponding to one control pattern may be increased. However, according to the third embodiment, the hydrogen supply quantity in the implementation period of one control pattern is increased, thus the increase of the number of implementations of the pressure rise-fall per unit time can be suppressed. With this, the stress applied to the fuel cell stack 1 or hydrogen-associated components can be relieved, thus the deterioration of the fuel cell system 100 can be suppressed.

Moreover, according to the third embodiment, as shown in FIG. 16, the first keeping time Tp1 for keeping the pressure of the fuel electrode 67 at the upper limit pressure P1 before implementing the first process and the second keeping time Tp2 for keeping the pressure of the fuel electrode 67 at the lower limit pressure P2 before implementing the second process can be set to the control pattern. Then, the higher the required load is, the longer the controller 40 sets the first keeping time Tp1 or the second keeping time Tp2. With the required load being high, the hydrogen consumption quantity is increased, to thereby increase pressure drop speed in the first process. However, according to the third embodiment, the larger the required load is, the longer the first keeping time Tp1 and second keeping time Tp2 are set. With this, the period from the timing at which the pressure of the fuel electrode 67 reaches the upper limit pressure P1 to the timing at which the pressure of the fuel electrode 67 is returned from the lower limit pressure P2 to the upper limit pressure P1 can be set long. That is, setting long the first keeping time Tp1 and second keeping time Tp2 can elongate the implementation period of one control pattern, thus suppressing the increase in the number of implementations of the pressure rise-fall per unit time. With this, the stress applied to the fuel cell stack 1 or hydrogen-associated components can be relieved, thus suppressing the deterioration of the fuel cell system 100.

Especially, it is preferable that the higher the required load is, the longer the controller 40 sets the first keeping time Tp1. With the required load increased, as the case may be, it is difficult to secure the hydrogen partial pressure in the fuel electrode 67. Therefore, setting long the first keeping time Tp1 for the upper limit pressure P1 can bring about an effect that the hydrogen partial pressure can be secured with ease even when the required load is high.

Moreover, according to the third embodiment, the higher the required load is in the required load's region from the low load to the intermediate load, the longer the second keeping time Tp2 is set (lower in FIG. 17). From the low load to the intermediate load, the liquid water is likely to be stored in the fuel electrode 67. Setting long the second keeping time Tp2 for the lower limit pressure P2 can enhance accuracy of implementing the liquid water discharge process. Moreover, it is preferable that the higher the required load is in the required load's region from the intermediate load to the high load, the longer the controller 40 sets the first keeping time Tp1 (upper in FIG. 17). When the required load is increased, securing the hydrogen partial pressure in the fuel electrode 67 is, as the case may be, difficult. Therefore, setting long the first keeping time Tp1 for the upper limit pressure P1 can bring about an effect that the hydrogen partial pressure can be secured with ease even when the required load is high.

Figure 18:
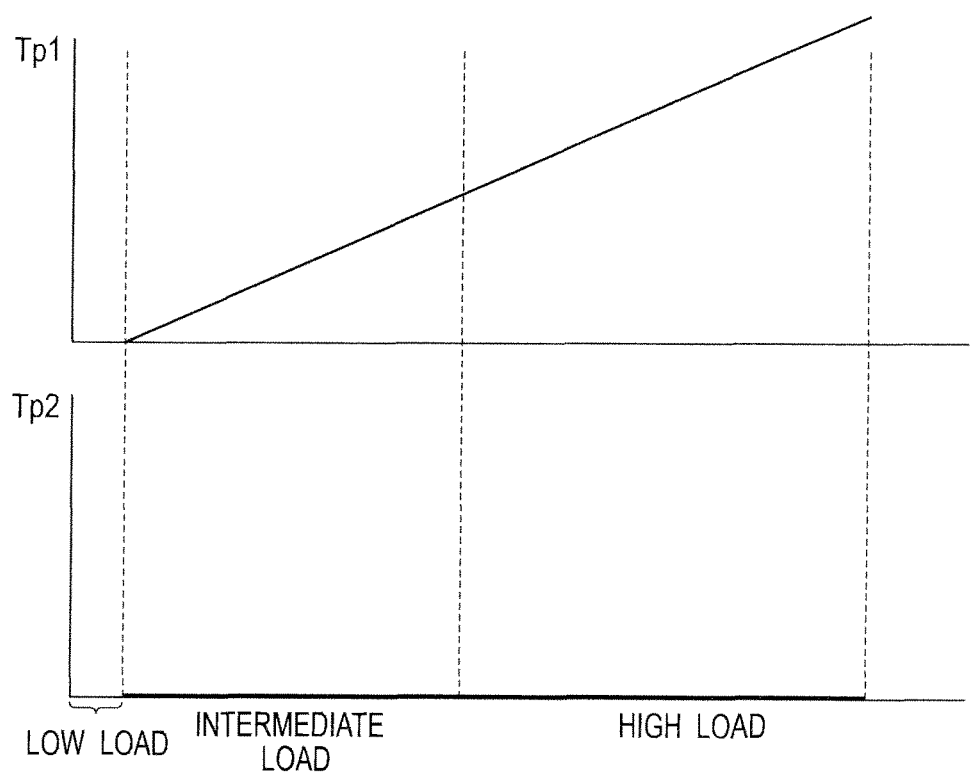
FIG. 18 is an explanatory view showing the load relative to each of the first keeping time Tp1 and the second keeping time Tp2.

In addition, as shown in FIG. 18, the hydrogen partial pressure may be secured in the following manner: the higher the impurity concentration such as the nitrogen concentration in the fuel electrode 67 is (namely, immediately after the fuel cell system 100 is started), the longer the first keeping time Tp1 for keeping the upper limit pressure P1 is set. In this case, the longer the time until the fuel cell system 100 restarts after stop, the higher the inactive gas concentration in the fuel electrode 67 is. Therefore, the first keeping time Tp1 for keeping the upper limit pressure P1 may be made variable by measuring the stop period of the fuel cell system 100 or by measuring the nitrogen concentration in the fuel electrode 67 at the start of the fuel cell system 100.

Moreover, in the fuel cell system 100 that adopts no idling (or idle reduction) which, at the low load and the like, temporarily stops generation of the fuel cell stack 1 and allows traveling by means of a power of a secondary battery, the nitrogen concentration in the fuel electrode 67 is high even immediately after the recovery from the no idling (or idle reduction). Then, in such a scene as well, the first keeping time Tp1 may be set long.

Fourth Embodiment

Hereinafter, the fuel cell system 100 according to the fourth embodiment of the present invention is to be set forth. Herein, the structure of the fuel cell system 100 according to the fourth embodiment is like those according to the first to third embodiments, therefore repeated explanations are to be omitted. According to the fourth embodiment, a method of setting the upper limit pressure P1 and lower limit pressure P2 is to be set forth.

(First Setting Method)

With respect to the first setting method, the upper limit pressure P1 and the lower limit pressure P2 can be set according to the load current. Based on the vehicle speed, the acceleration operation quantity of the driver, and the information about the secondary battery, the controller 40 determines the fuel cell stack 1's target generation power as the required load for the fuel cell system 100. Based on the target generation power, the controller 40 calculates the load current which is a current value to be taken out from the fuel cell stack 1.

Figure 19:
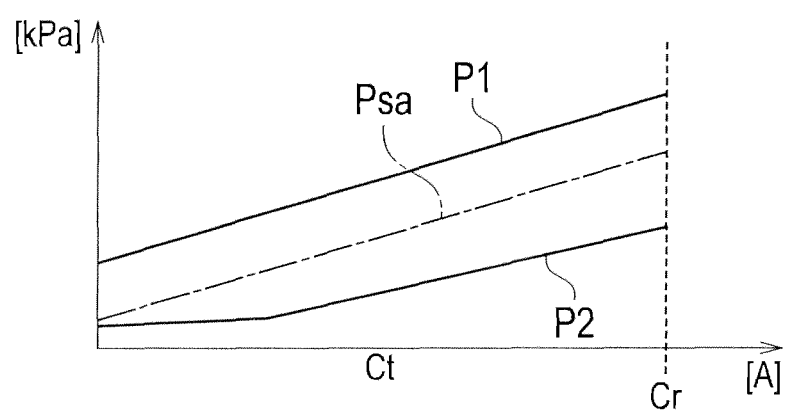
FIG. 19 is an explanatory view showing the upper limit pressure P1 and lower limit pressure P2 relative to the load current.

FIG. 19 is an explanatory view showing the upper limit pressure P1 and lower limit pressure P2 relative to the load current Ct. An operation pressure Psa for supplying the reactive gas necessary for taking out the load current Ct from the fuel cell stack 1 can be defined through experiments or simulations in view of the fuel cell system 100's characteristics such as the fuel cell stack 1, hydrogen system, air system and the like. Cr in FIG. 19 denotes a rated load current Cr {likewise, in an after-described FIG. 20(*b*)}.

For supplying air to the oxidant electrode 34, the operation pressure Psa is set as a target operation pressure.

Contrary to this, for supplying hydrogen to the fuel electrode 67, the upper limit pressure P1 and the lower limit pressure P2 are respectively set based on the operation pressure Psa. Herein, the upper limit pressure P1 and the lower limit pressure P2 are so set that the larger the load current Ct is, the larger the differential pressure between the upper limit pressure P1 and the lower limit pressure P2 is, that is, the larger the pressure change width in the gas supply operation is.

With the above structure, the higher the required load is, the more the hydrogen supply quantity in the implementation period of one control pattern can be increased. With this, the increase in the number of implementations of the pressure rise-fall per unit time can be suppressed. With this, the deterioration of the fuel cell system 100 can be suppressed.

(Second Setting Method)

As the second setting method, the upper limit pressure P1 and the lower limit pressure P2 may be set in view of the generation safety of the fuel cell stack 1. In the case of the low load, that is, when the load current is small, the differential pressure between the upper limit pressure P1 and the lower limit pressure P2 is so set as to be relatively small, for example, about 50 kPa. In this case, the average hydrogen concentration in the individual fuel cell is about 40%. Contrary to this, in the case of the high load, that is, when the load current is large, the supply pressure on each of the oxidant electrode 34 side and the fuel electrode 67 side is to be entirely increased since the gas pressure made larger can increase the generation efficiency. In addition, the difference between the upper limit pressure P1 and the lower limit pressure P2 is set at about 100 kPa. In this case, the fuel cell stack 1 is operated with the average hydrogen concentration of about 75% in the individual fuel cell.

According to the fourth embodiment which implements the periodical pressure rise-fall, the atmosphere in the fuel cell stack 1 (fuel electrode 67) is in a condition that the hydrogen concentration is low at the timing of the lower limit pressure P2 while the hydrogen concentration is high at the timing of the upper limit pressure P1. That is, increasing the pressure from the lower limit pressure P2 to the upper limit pressure P1 introduces a high hydrogen concentration gas to the fuel electrode 67, to thereby push a low hydrogen concentration gas from the fuel cell stack 1 to the capacity portion 12. Moreover, the high hydrogen concentration gas agitates the gas in the fuel electrode 67.

Figure 20:
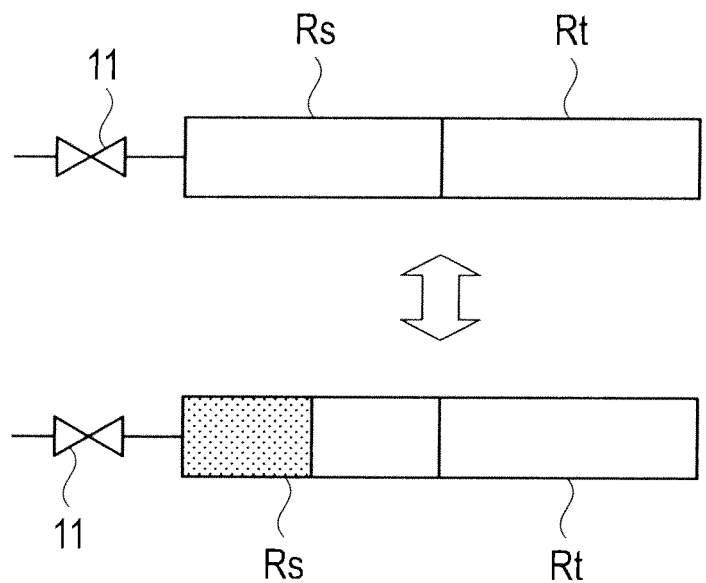
FIG. 20(a) is an explanatory view schematically showing the fuel electrode side capacity Rs in the fuel cell stack and the capacity Rt of the capacity portion.
FIG. 20(b) shows that new hydrogen flowed into the fuel cell stack in an amount of around ¼ of the capacity of the fuel system.
Figure 20:
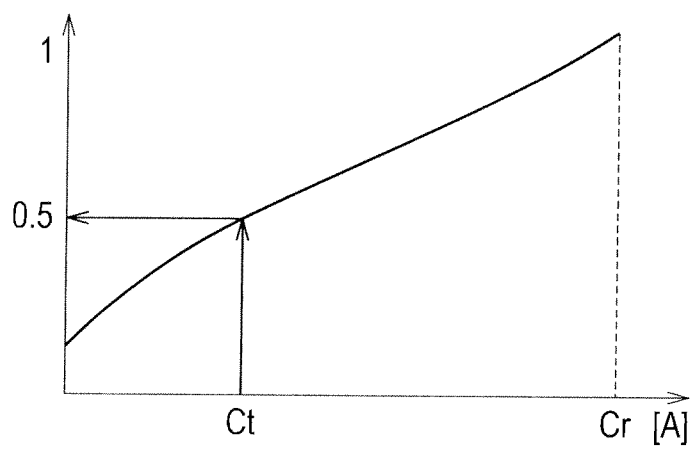

FIG. 20(*a*) and FIG. 20(*b*) are explanatory views schematically showing the fuel electrode 67 side capacity Rs and the capacity Rt of the capacity portion 12 in the fuel cell stack 1. For example, in the case where the upper limit pressure P1 is set at 200 kPa (absolute pressure) and the lower limit pressure P2 is set at 150 kPa (absolute pressure), the pressure ratio P1/P2 between the upper limit pressure P1 and the lower limit pressure P2 is about 1.33. In this case, as shown in FIG. 20(*a*), the pressure increased from the lower limit pressure P2 to the upper limit pressure P1 allows an inflow of additional hydrogen to about ¼ of the capacity (specifically, the capacity of the fuel cell stack 1 and the capacity of the capacity portion 12) of the fuel system (=hydrogen system), that is, to 50% point of the fuel cell stack 1 [hereinafter, this condition is expressed as hydrogen exchange ratio 0.5 {refer to FIG. 20(*b*)}].

In the case of the low load, the hydrogen consumption speed is low, therefore, the hydrogen exchange ratio of around the above degree can implement the generation of the fuel cell stack 1. In this scene, for example, the hydrogen concentration of the time-averaged hydrogen electrode off-gas is about 40%. Contrary to this, in the case of the high load, the pressure ratio P1/P2 (for example, 2 or more) which replaces the entire fuel electrode 67 of the fuel cell stack 1 with the additional hydrogen is preferable, that is, the hydrogen exchange ratio of about 1 is preferable. Although the discharged hydrogen concentration is preferably suppressed low, the hydrogen concentration greater than or equal to a predetermined value is necessary for stably implementing the generation (for example, about 75% or more is necessary) since the hydrogen consumption speed is high.

In the above cases, for adjusting the hydrogen concentration, the purge valve 14 opens the fuel electrode off-gas flow channel L2. With this, such a minor amount of gas (flow rate) can be continuously or intermittently discharged from the purge valve 14 as not to prevent the hydrogen supply attributable to the periodical pressure rise-fall. Since the gas (flow rate) discharged from the purge valve 14 is minor, the gas is diluted by a cathode side exhaust (off gas) and then is safely discharged out of the system. Opening of the purge valve 14 is implemented for discharging the impurities (nitrogen or steam) from the fuel electrode 67, however, hydrogen is mixed in the fuel electrode 67. Therefore, it is preferable to effectively discharge the impurities by suppressing the hydrogen discharge.

Then, according to the fourth embodiment, in the hydrogen supply, the purge valve 14 is controlled to the open state corresponding to the process for increasing the hydrogen pressure from the lower limit pressure P2 to the upper limit pressure P1 (second process), to thereby open the purge valve 14 (purge process). Specifically, the controller 40 monitors the pressure of the fuel electrode 67 of the fuel cell stack 1, and then controls the purge valve 14 to the open state according to a timing at which the monitored pressure reaches the lower limit pressure P2, moreover, the controller 40 controls the purge valve 14 to the closed state according to a timing at which the monitored pressure reaches the upper limit pressure P1 (basic control pattern). With this, the low hydrogen concentration gas is pushed into the capacity portion 12 from the fuel cell stack 1, and then, the low hydrogen concentration gas is discharged from the capacity portion 12 by way of the purge valve 14 before the high concentration hydrogen gas reaches the purge valve 14. With this, many impurities can be efficiently discharged.

However, the opening-closing control of the purge valve 14 is not limited to this basic control pattern. Provided that the purge valve 14 is so controlled to the open state as to include at least the process of increasing the pressure from the lower limit pressure P2 to the upper limit pressure P1 (second process), the opening-closing control of the purge valve 14 is sufficient. Therefore, the timing for controlling the purge valve 14 to the closed state can be modified also to a timing which is later than the timing (hereinafter, referred to as "basic closing timing") at which the hydrogen pressure reaches the upper limit pressure P1. For example, in view of a diffusion speed, a boundary between the high concentration hydrogen and the low concentration hydrogen can be determined as a constant face within a short time. Then, with respect to the fuel cell stack 1 and capacity portion 12 during the hydrogen supply operation, how long time it takes for a boundary face (what is called a hydrogen front) to reach and up to which position the boundary face reaches are to be estimated in advance through experiments or simulations. Then, until the boundary face reaches the purge valve 14, the timing of controlling the purge valve 14 to the closed state can be further delayed than the basic closing timing.

Moreover, it is not necessary to implement the purge treatment for each implementation of the control pattern, specifically, for every pressure increasing process (second process). For example, on the condition that the hydrogen concentration in the fuel electrode 67 reaches less than or equal to a predetermined determination threshold, the purge valve 14 may be opened according to the subsequent pressure increasing process.

Moreover, since the liquid water also is regarded as a factor for disturbing the generation reaction, the liquid water can also be discharged. However, compared with the presence of the inactive gas, the time for the liquid water to cause an influence is longer. Therefore, it is preferable to implement the liquid water discharge treatment once in a plurality of periodical pressure rise-fall operations or at predetermined time intervals, instead of every periodical pressure rise-fall operation. It is sufficient that the liquid water be removed from inside the fuel cell stack 1. Therefore, the discharging of the liquid water from the fuel cell stack 1 to the capacity portion 12 is to be taken into account. In this case, since increase of the flow velocity is necessary, the differential pressure between the upper limit pressure P1 and the lower limit pressure P2 is preferably set about 100 kPa.

Moreover, in terms of the upper limit pressure P1 and the lower limit pressure P2, the following additional methods can be set in addition to the thus-far described method of varying the upper limit pressure P1 and the lower limit pressure P2 according to the required load.

At first, as the first additional method, the upper limit pressure P1 and the lower limit pressure P2 may be set according to an allowable differential pressure between the oxidant electrode 34 and fuel electrode 67 in the fuel cell.

Moreover, as the second additional method, in the fuel cell system 100 for implementing the purge treatment for discharging the inactive gas accumulated in the fuel electrode 67, the upper limit pressure P1 and the lower limit pressure P2 may be so restricted as to secure the minimum pressure for securely implementing the purging.

Moreover, as the third additional method, the upper limit pressure P1 is set larger as the nitrogen concentration (impurity concentration) in the fuel electrode 67 is higher, and the lower limit pressure P2 is set to a small value in a condition that the liquid water staying quantity or liquid water generation quantity in the fuel electrode 67 is expected to be large. With this, a large differential pressure is already secured when it is determined that the liquid water is actually stored, to thereby be able to securely implement the liquid water discharge.

Figure 21:
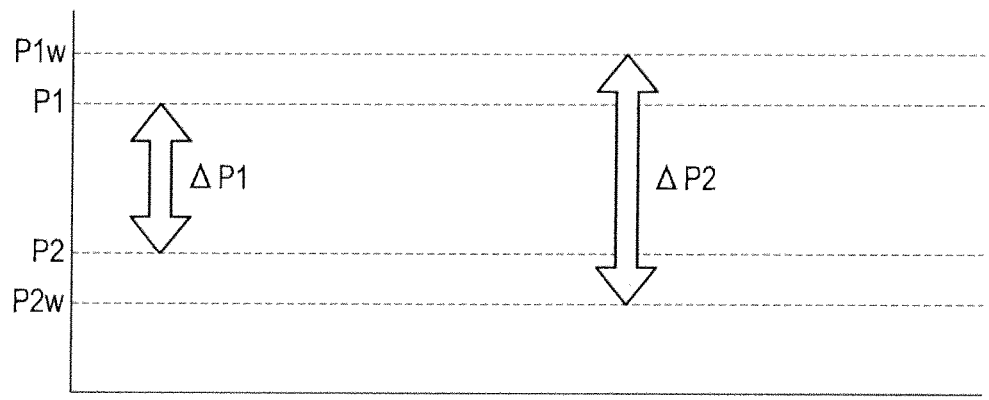
FIG. 21 is an explanatory view of the upper limit pressure P1 and lower limit pressure P2.

Moreover, as the fourth additional method, in a scene where the liquid water quantity staying in the fuel cell stack 1 is assumed to be large, as shown in FIG. 21, the upper limit pressure P1 and the lower limit pressure P2 are so set as to allow the pressure ratio (P1/P2) between the upper limit pressure P1 and the lower limit pressure P2 is temporarily large (P1$w$/P2$w$). The pressure width ΔP2 (=P1$w$–P2$w$) necessary for discharging the liquid water, in the fuel electrode 67 is, for example, more than or equal to 100 kPa, and the pressure width ΔP1 (=P1-P2) for discharging the inactive gas in the fuel electrode 67 is, for example, more than or equal to 50 kPa. As stated above, since the pressure widths of the two are different from each other, the upper limit pressure P1 and the lower limit pressure P2 are set as described above in view of the liquid water discharge.

Herein, when the upper limit pressure P1 is set high, that is, to P1$w$, as stated in the third and fourth additional methods, the speed of lowering the pressure from the upper limit pressure P1 to the lower limit pressure P2 is decreased since the hydrogen consumption speed is small in the low load region. In this case, since the time is required until the pressure reaches the lower limit pressure P2, as the case may be, the second process for increasing the pressure from the lower limit pressure P2 to the upper limit pressure P1 cannot be implemented for a while.

Figure 22:
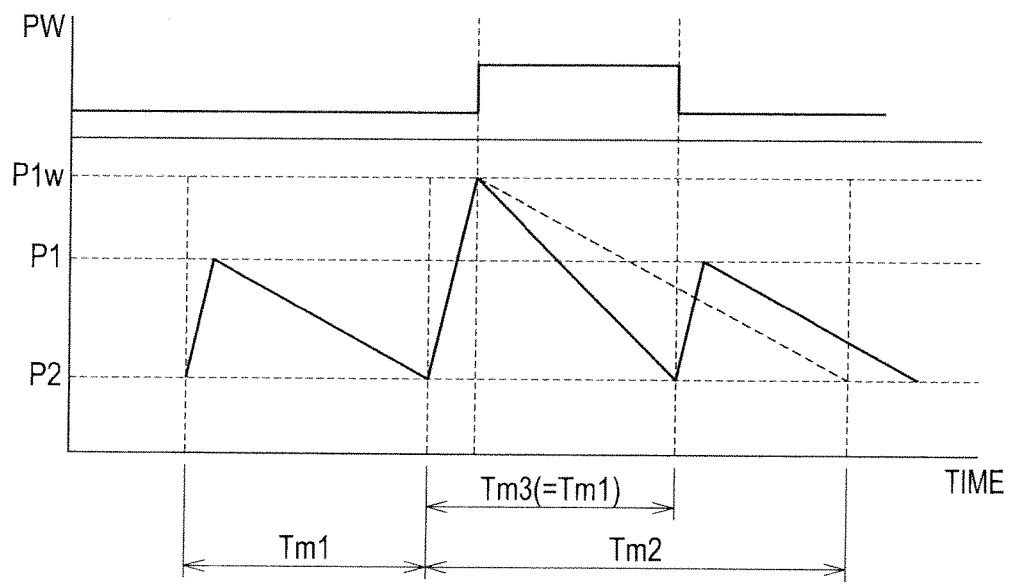
FIG. 22 is an explanatory view of a pressure fall speed.

Then, as shown in FIG. 22, when the upper limit pressure P1 is set high (for example, pressure P1$w$) in the low load condition, it is permitted that the controller 40 temporarily increases the current taken out from the fuel cell stack 1, to thereby increase the pressure drop speed. For example, when the current is not increased, the time required for decreasing the pressure from the upper limit pressure P1$w$ to the lower limit pressure P2 is a time Tm2. Meanwhile, increasing the current allows the time required for decreasing the pressure from the upper limit pressure P1$w$ to the lower limit pressure P2 to be a time Tm3 (=Tm1) which is shorter than the time Tm2. With this, an interference to the pressure rise-fall control for the inactive gas discharge or an interference to the pressure rise-fall control for the subsequent liquid water discharge can be suppressed.

In addition, when the generation condition may possibly be made unstable attributable to a temporary increase of the current taken out of the fuel cell stack 1, which temporary increase is implemented in such a scene that the voltage of the fuel cell stack 1 is lowered, or in the case where the charge level of the secondary battery for storing the taken-out current is high, another method may be used for increasing the pressure drop speed, instead of the method of increasing the taken-out current.

As the other method for increasing the pressure drop speed, for example, the flow rate of the fuel electrode off-gas discharged from the purge valve 14 is to be increased. Moreover, the pressure drop speed may be increased by enlarging the capacity of the fuel electrode 67. As a method for enlarging the capacity of the fuel electrode 67, the liquid water control level in the fuel electrode 67 is lowered, to thereby discharge the liquid water in the fuel electrode 67.

In addition, as a method of estimating the liquid water staying quantity in the fuel electrode 67, an estimation method by accumulating the load current based on the feature that the liquid water generation quantity is substantially proportional to the load current can be considered. Moreover, the liquid water staying quantity may be estimated by the time elapsed from the timing of the liquid water discharge implemented in advance. Moreover, by measuring the voltage of the fuel cell, estimating, based on the fuel cell's voltage which is abnormally lowered, that the liquid water staying quantity is large is allowed. Moreover, in the estimation of the liquid water staying quantity, the temperature of the coolant water for cooling the fuel cell stack 1 can be used for correcting the liquid water staying quantity. The reason therefore is that even when the load current is the same, the lower the coolant water temperature is, the more the liquid water (quantity) stays. Likewise, the number of pressure pulsations or the cathode's air quantity can also correct the liquid water staying quantity.

Fifth Embodiment

Hereinafter, the fuel cell system 100 according to the fifth embodiment of the present invention is to be set forth. According to the third embodiment, the ordinary operation process for implementing the generation according to the load current in the fuel cell stack 1 has been set forth. Meanwhile, according to the fifth embodiment, the process of each of at the start and stop of the fuel cell system 100 is to be set forth. Herein, the structure of the fuel cell system 100 according to the fifth embodiment is like those according to the first to fourth embodiments, therefore repeated explanations are to be omitted and differences are to be mainly set forth.

(Start Process)

At first, the start process of the fuel cell system 100 is to be set forth. In the case where after the stop of the fuel cell system 100, the fuel cell stack 1 is left as it is for a while instead of being started immediately, the low hydrogen concentration gas is filled in the fuel electrode 67. In the case of starting the system 10 in the above state, the low hydrogen concentration gas is to be discharged from the fuel electrode 67 of the fuel cell stack 1. Therefore, the high hydrogen concentration gas is to be momentarily supplied from the fuel tank 10 at a predetermined starting upper limit pressure, to thereby increase the gas pressure in the fuel electrode 67. In this case, the purge valve 14 is also controlled to the open state. With this, the passage of the hydrogen front which is the boundary face between the low hydrogen concentration gas and the high hydrogen concentration gas can be accelerated, and also the hydrogen front can be pushed out of the fuel electrode 67.

Then, before the timing at which the hydrogen front reaches the purge valve 14, the hydrogen pressure adjusting valve 11 and the purge valve 14 are controlled to the closed state, to thereby implement the generation and consume hydrogen, thus reducing the hydrogen pressure in the fuel electrode 67. Then, when the hydrogen pressure reaches a predetermined starting lower limit pressure, the hydrogen pressure is again increased to the predetermined starting upper limit pressure. Then, the above pressure rise-fall operations are to be repeated until the hydrogen concentration of the fuel electrode 67 of the fuel cell stack 1 reaches the predetermined average hydrogen concentration.

In addition, an actual vehicle, as the case may be, starts moving during the period that the above start process is being implemented. In this case, the output from the installed secondary battery may be used.

(Stop Process)

Then, the stop process of the fuel cell system 100 is to be set forth. As a start scene after stopping the fuel cell system 100, a low temperature environment is assumed. In this case, when the liquid water is present in the fuel cell stack 1, hydrogen pressure adjusting valve 11, discharge water valve 13, purge valve 14 and the like at the stop of the fuel cell system 100, as the case may be, freezing and the like disenables starting of the fuel cell system 100. Therefore, it is necessary to establish a process for removing the liquid water at the stop of the fuel cell system 100. At first, air is to be supplied to the oxidant electrode 34 while implementing the generation in the low load condition. On the fuel electrode 67 side, the pressure rise-fall operations are to be repeatedly implemented according to the control pattern, like the third embodiment. In this case, for example, with the upper limit pressure P1 at 200 kPa (absolute pressure) and the lower limit pressure P2 at 101.3 kPa, sufficient values should be set in advance for discharging the liquid water from the fuel electrode 67. Moreover, the number of repetitions of pressure rise-fall operations for sufficiently discharging the liquid water are to be obtained in advance through experiments or simulations. Based the thus obtained numbers, the pressure rise-fall operations should be repeated. With this, the generation is ended.

Then, with the discharge water valve 13 controlled to the open state, the discharge liquid water from the fuel cell stack 1 to the capacity portion 12 is discharged. Then, the power which was generated immediately before the discharge operation is used, to thereby operate heating devices such as heater and the like after the above discharge operation, thus heating the purge valve 14 and the discharge water valve 13, to thereby dry the discharge liquid water.

According to the fifth embodiment, in the fuel cell system 100, the stop process can accomplish startability at the start, in addition, even the process at the start can discharge impurities more preferentially than hydrogen.

The entire contents of the Japanese Patent Application Laid-Open No. 2008-298191 (filed on Nov. 21, 2008) and Japanese Patent Application Laid-Open No. 2008-302465 (filed on Nov. 27, 2008) are incorporated herein by reference in order to take protection against translation errors or omitted portions.

As set forth above, the contents of the present invention have been set forth based on the embodiments. However, it is obvious to a person skilled in that art that the present invention is not limited to the above embodiments and various modifications and improvements thereof are allowed.

INDUSTRIAL APPLICABILITY

According to the present invention, based on the first pressure change pattern for implementing the pressure change at the first pressure width, the pressure of the fuel gas in the fuel electrode is periodically changed, to thereby be able to agitate the fuel electrode side gas. With this, the fuel electrode side gas can be made even.

The invention claimed is:

1. A fuel cell system comprising:
a fuel cell for generating a power by causing an electrochemical reaction between an oxidant gas supplied to an oxidant electrode and a fuel gas supplied to a fuel electrode;
a fuel gas supplier for supplying the fuel gas to the fuel electrode, the fuel gas supplier including a fuel electrode inlet flow channel and a valve provided in the fuel electrode inlet flow channel, wherein the fuel gas is supplied to the fuel electrode through the fuel electrode inlet flow channel and the valve;
a fuel electrode off-gas flow channel led directly from the fuel electrode for discharging a fuel electrode off-gas to atmosphere, wherein the fuel electrode off-gas flow channel includes a limiter for limiting a return of the fuel electrode off-gas to the fuel electrode inlet flow channel, and wherein the limiter includes a buffer device and a purge valve that are disposed in the fuel electrode off-gas flow channel; and
a controller for controlling the fuel gas supplier, wherein the controller is programmed to control a valve opening degree of the valve provided in the fuel electrode inlet flow channel such that a pressure of the fuel gas at the fuel electrode changes in a first pressure change pattern and in a second pressure change pattern, wherein the first pressure change pattern comprises periodical changes in the pressure of the fuel gas at the fuel electrode over a first pressure range, and wherein the second pressure change pattern comprises periodical changes in the pressure of the fuel gas at the fuel electrode over a second pressure range which is larger than the first pressure range and has a lower implementation frequency than an implementation frequency of the first pressure change pattern.

2. The fuel cell system according to claim 1, wherein:
the buffer device has a space of a predetermined capacity, and
the purge valve is disposed on a downstream side of the buffer device in the fuel electrode off-gas flow channel and configured to shut the fuel electrode off-gas flow channel.

3. The fuel cell system according to claim 1, wherein the controller implements the second pressure change pattern after implementing a plurality of the first pressure change patterns.

4. The fuel cell system according to claim 1, wherein
in a state that the power generation of the fuel cell is implemented by supplying the fuel gas from the fuel gas supplier at a predetermined operation pressure, the controller stops supplying the fuel gas to the fuel cell, and in a condition that the fuel gas pressure at the fuel electrode is decreased by a predetermined pressure range, the controller restarts supplying the fuel gas to the fuel cell, to thereby change the fuel gas pressure in the fuel electrode.

5. The fuel cell system according to claim 1, wherein the lower an operation temperature of the fuel cell is, the smaller the controller sets a supply quantity of the fuel gas supplied to the fuel electrode attributable to the pressure change.

6. The fuel cell system according to claim 1, further comprising:
an oxidant gas supplier for supplying the oxidant gas to the oxidant electrode,
wherein the smaller an operation pressure of the oxidant gas in the oxidant electrode is, the smaller the controller sets a supply quantity of the fuel gas supplied to the fuel electrode attributable to the pressure change.

7. The fuel cell system according to claim 1, wherein when the controller sets smaller the supply quantity of the fuel gas supplied to the fuel electrode attributable to the pressure change, the controller sets longer an implementation period of the pressure change.

8. The fuel cell system according to claim 5, wherein when the controller sets smaller the supply quantity of the fuel gas supplied to the fuel electrode attributable to the pressure change, the controller sets longer an implementation period of the pressure change.

9. The fuel cell system according to claim 6, wherein when the controller sets smaller the supply quantity of the fuel gas supplied to the fuel electrode attributable to the pressure change, the controller sets longer an implementation period of the pressure change.

10. The fuel cell system according to claim 1, wherein when the controller sets smaller the supply quantity of the fuel gas supplied to the fuel electrode attributable to the pressure change, the controller sets smaller a pressure range.

11. The fuel cell system according to claim 5, wherein when the controller sets smaller the supply quantity of the fuel gas supplied to the fuel electrode attributable to the pressure change, the controller sets smaller a pressure range.

12. The fuel cell system according to claim 6, wherein when the controller sets smaller the supply quantity of the fuel gas supplied to the fuel electrode attributable to the pressure change, the controller sets smaller a pressure range.

13. The fuel cell system according to claim 1, wherein when the controller sets smaller the supply quantity of the fuel gas supplied to the fuel electrode attributable to the pressure change, the controller decreases an implementation frequency of the second pressure change pattern relative to the first pressure change pattern.

14. The fuel cell system according to claim 5, wherein when the controller sets smaller the supply quantity of the fuel gas supplied to the fuel electrode attributable to the pressure change, the controller decreases an implementation frequency of the second pressure change pattern relative to the first pressure change pattern.

15. The fuel cell system according to claim 6, wherein when the controller sets smaller the supply quantity of the fuel gas supplied to the fuel electrode attributable to the pressure change, the controller decreases an implementation frequency of the second pressure change pattern relative to the first pressure change pattern.

16. The fuel cell system according to claim 1, further comprising:
an output takeout device for taking out an output from the fuel cell,
wherein, the controller so controls the output takeout device as to take out an output from the fuel cell where the output corresponds to a required load required for the fuel cell system, and the controller controls fuel gas supply-and-stop by the fuel gas supplier based on a predetermined control pattern to thereby supply the fuel gas in such a manner as to periodically change the pressure at the fuel electrode,
the predetermined control pattern includes:
a first process for decreasing the pressure of the fuel electrode from an upper limit pressure to a lower limit pressure, and
a second process for returning the pressure of the fuel electrode from the lower limit pressure to the upper limit pressure, and
when the required load is high, the controller increases the fuel gas supply quantity in one implementation period of the predetermined control pattern compared with when the required load is low.

17. The fuel cell system according to claim 16, wherein
a first keeping time for keeping the pressure of the fuel electrode at the upper limit pressure before the first process is implemented or a second keeping time for keeping the pressure of the fuel electrode at the lower limit pressure before the second process is implemented can be set to the predetermined control pattern, and
the higher the required load is, the longer the controller sets the first keeping time or the second keeping time.

18. The fuel cell system according to claim 16, wherein
a first keeping time for keeping the pressure of the fuel electrode at the upper limit pressure before the first process is implemented can be set to the predetermined control pattern, and
the higher the required load is, the longer the controller sets the first keeping time.

19. The fuel cell system according to claim 17, wherein the higher the required load is in a region from a low load to an intermediate load, the longer the controller sets the second keeping time.

20. The fuel cell system according to claim 17, wherein the higher the required load is in a region from an intermediate load to a high load, the longer the controller sets the first keeping time.

21. The fuel cell system according to claim 16, wherein
a first keeping time for keeping the pressure of the fuel electrode at the upper limit pressure before the first process is implemented can be set to the predetermined control pattern, and
the higher an impurity concentration in the fuel electrode is, the longer the controller sets the first keeping time.

22. The fuel cell system according to claim 16, wherein the higher an impurity concentration in the fuel electrode is, the larger the controller sets the upper limit pressure.

23. The fuel cell system according to claim 22, wherein when the required load is low, the controller sets large a pressure drop speed in the first process.

24. The fuel cell system according to claim 16, wherein the more a liquid water quantity in the fuel electrode is, the smaller the controller sets the lower limit pressure.

25. A method of controlling a fuel cell system, comprising:
generating a power by causing an electrochemical reaction between an oxidant gas supplied to an oxidant electrode and a fuel gas supplied to a fuel electrode;

supplying the fuel gas to the fuel electrode through a fuel electrode inlet flow channel and a valve provided in the fuel electrode inlet flow channel;

discharging a fuel electrode off-gas to atmosphere through a fuel electrode off-gas flow channel led directly from the fuel electrode, wherein the fuel electrode off-gas flow channel includes a limiter for limiting a return of the fuel electrode off-gas to the fuel electrode inlet flow channel, and the limiter includes a buffer device and a purge valve that are disposed in the fuel electrode off-gas flow channel; and controlling the supplying operation of the fuel gas by controlling a valve opening degree of the valve provided in the fuel electrode inlet flow channel such that a pressure of the fuel gas at the fuel electrode changes in a first pressure change pattern and in a second pressure change pattern, wherein the first pressure change pattern comprises periodical changes in the pressure of the fuel gas at the fuel electrode over a first pressure range, and wherein the second pressure change pattern comprises periodical changes in the pressure of the fuel gas at the fuel electrode over a second pressure range which is larger than the first pressure range and has a lower implementation frequency than an implementation frequency of the first pressure change pattern.

26. A fuel cell system comprising:

a fuel cell for generating a power by causing an electrochemical reaction between an oxidant gas supplied to an oxidant electrode and a fuel gas supplied to a fuel electrode;

means for supplying the fuel gas to the fuel electrode that includes a fuel electrode inlet flow channel and a valve provided in the fuel electrode inlet flow channel, wherein the fuel gas is supplied to the fuel electrode through the fuel electrode inlet flow channel and the valve;

means for discharging a fuel electrode off-gas to atmosphere that is led directly from the fuel electrode and includes a limiter for limiting a return of the fuel electrode off-gas to the fuel electrode, and wherein the limiter includes a buffer device and a purge valve that are disposed in the means for discharging the fuel electrode off-gas; and means for controlling the supplying means by controlling a valve opening degree of the valve provided in the fuel electrode inlet flow channel such that a pressure of the fuel gas at the fuel electrode changes in a first pressure change pattern and in a second pressure change pattern, wherein the first pressure change pattern comprises periodical changes in the pressure of the fuel gas at the fuel electrode over a first pressure range, and wherein the second pressure change pattern comprises periodical changes in the pressure of the fuel gas at the fuel electrode over a second pressure range which is larger than the first pressure range and has a lower implementation frequency than an implementation frequency of the first pressure change pattern.

* * * * *